(12) United States Patent
Banshoya et al.

(10) Patent No.: US 10,065,633 B2
(45) Date of Patent: Sep. 4, 2018

(54) HYBRID VEHICLE

(71) Applicant: Toyota Jidosha Kabushiki Kaisha, Toyota-shi, Aichi-ken (JP)

(72) Inventors: Hidehiko Banshoya, Toyota (JP); Atsushi Tabata, Okazaki (JP); Toshiki Kanada, Anjo (JP); Haruhisa Suzuki, Nagoya (JP); Atsushi Kawamoto, Toyota (JP); Tatsuya Imamura, Okazaki (JP); Kiyonori Takagi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 343 days.

(21) Appl. No.: 15/164,079

(22) Filed: May 25, 2016

(65) Prior Publication Data
US 2016/0347307 A1 Dec. 1, 2016

(30) Foreign Application Priority Data

May 26, 2015 (JP) ................................. 2015-106323

(51) Int. Cl.
*B60W 20/00* (2016.01)
*B60W 20/20* (2016.01)
(Continued)

(52) U.S. Cl.
CPC ............... *B60W 20/20* (2013.01); *B60K 6/24* (2013.01); *B60K 6/26* (2013.01); *B60K 6/365* (2013.01); *B60K 6/387* (2013.01); *B60K 6/442* (2013.01); *B60K 6/445* (2013.01); *B60K 6/547* (2013.01); *B60W 10/02* (2013.01); *B60W 10/06* (2013.01);
(Continued)

(58) Field of Classification Search
CPC ....... B60W 20/20; B60K 6/365; B60K 6/387; B60K 6/445
See application file for complete search history.

(56) References Cited

U.S. PATENT DOCUMENTS 6,203,468 B1 * 3/2001 Nitta ..................... B60W 10/02
477/5
9,216,641 B2 12/2015 Ono et al.
(Continued)

FOREIGN PATENT DOCUMENTS

CN 107206886 A 9/2017
JP 2016-150673 A 8/2016
(Continued)

*Primary Examiner* — Jelani A Smith
*Assistant Examiner* — Donald J Wallace
(74) *Attorney, Agent, or Firm* — Oliff PLC

(57) ABSTRACT

A hybrid vehicle includes an electronic control unit configured to, when the drive mode is changed from one of the series-parallel mode and the parallel mode to the other one of the series-parallel mode and the parallel mode and the speed stage is changed from one of the low speed stage and the high speed stage to the other one of the low speed stage and the high speed stage, selectively execute either one of a first control and a second control. The first control is control in which the drive mode and the speed stage are changed by passing through the series mode. The second control is control in which one of the drive mode and the speed stage is changed and then the other one of the drive mode and the speed stage is changed without passing through the series mode.

6 Claims, 15 Drawing Sheets

(51) Int. Cl.

| | |
|---|---|
| *B60K 6/365* | (2007.10) |
| *B60K 6/387* | (2007.10) |
| *B60K 6/445* | (2007.10) |
| *B60W 10/06* | (2006.01) |
| *B60W 10/08* | (2006.01) |
| *B60W 10/115* | (2012.01) |
| *F16H 3/72* | (2006.01) |
| *B60W 20/30* | (2016.01) |
| *B60K 6/24* | (2007.10) |
| *B60K 6/26* | (2007.10) |
| *B60K 6/442* | (2007.10) |
| *B60K 6/547* | (2007.10) |
| *B60W 10/02* | (2006.01) |
| *B60W 10/10* | (2012.01) |
| *B60W 10/12* | (2012.01) |
| *B60K 6/38* | (2007.10) |
| *F16H 37/08* | (2006.01) |

(52) U.S. Cl.
CPC ............ *B60W 10/08* (2013.01); *B60W 10/10* (2013.01); *B60W 10/115* (2013.01); *B60W 10/12* (2013.01); *B60W 20/30* (2013.01); *F16H 3/728* (2013.01); *B60K 2006/381* (2013.01); *B60W 2710/021* (2013.01); *B60W 2710/1011* (2013.01); *B60W 2710/12* (2013.01); *B60Y 2200/92* (2013.01); *B60Y 2300/182* (2013.01); *F16H 2037/0873* (2013.01); *F16H 2200/2007* (2013.01); *F16H 2200/2038* (2013.01); *F16H 2302/04* (2013.01); *Y02T 10/6239* (2013.01); *Y02T 10/6286* (2013.01); *Y10S 903/905* (2013.01); *Y10S 903/906* (2013.01); *Y10S 903/911* (2013.01); *Y10S 903/914* (2013.01); *Y10S 903/919* (2013.01); *Y10S 903/93* (2013.01)

(56) References Cited

U.S. PATENT DOCUMENTS

| | | | |
|---|---|---|---|
| 9,481,235 B1* | 11/2016 | Banshoya | ............... F16H 3/728 |
| 9,975,545 B2* | 5/2018 | Banshoya | ............. B60W 20/20 |
| 2007/0191180 A1* | 8/2007 | Yang | ...................... B60K 6/387 477/5 |
| 2010/0133027 A1* | 6/2010 | Hung | ..................... B60K 6/442 180/65.23 |
| 2015/0021110 A1 | 1/2015 | Ono et al. | |
| 2015/0210268 A1* | 7/2015 | Yang | ...................... B60K 6/387 74/661 |
| 2015/0211620 A1 | 7/2015 | Matsubara et al. | |
| 2015/0353075 A1* | 12/2015 | Futatsudera | .......... B60K 6/442 701/22 |
| 2018/0022342 A1* | 1/2018 | Takagi | ................. B60W 20/20 |

FOREIGN PATENT DOCUMENTS

| | | |
|---|---|---|
| JP | 2016-215974 A | 12/2016 |
| WO | 2013/114594 A1 | 8/2013 |
| WO | 2014/013556 A1 | 1/2014 |
| WO | 2016/132205 A1 | 8/2016 |
| WO | 2016/132207 A1 | 8/2016 |

* cited by examiner

FIG. 4

| | | TRAVELING STATE | | C1 | B1 | CS | MG1 | MG2 |
|---|---|---|---|---|---|---|---|---|
| E1 | EV MODE | FORWARD/REVERSE | ONE-MOTOR | × | × | × | | M |
| E2 | | | TWO-MOTOR | △ | △ | × | M | G |
| E3 | | | DURING DRIVING | ○ | ○ | × | M | M |
| E4 | | | DURING ENGINE BRAKE | × | ○ | ○ | M | M |
| E5 | | | Ne = 0 | ○ | × | ○ | M | M |
| H1 | HV MODE | FORWARD | STEPLESS | Ne FREE | × | ○ | × | M | M |
| H2 | | | | HIGH GEAR | ○ | × | ○ | G | M |
| H6 | | | | LOW GEAR | × | ○ | × | G | M |
| H7 | | | STEPPED | HIGH GEAR | ONE-MOTOR | ○ | ○ | ○ | | M |
| H8 | | | | | TWO-MOTOR | ○ | × | ○ | M | M |
| H9 | | | | LOW GEAR | ONE-MOTOR | ○ | × | × | | M |
| H3 | | REVERSE | | TWO-MOTOR | LOW GEAR | × | × | × | M | M |
| H4 | SERIES MODE | FORWARD | | | | × | × | ○ | G | M |
| H5 | | REVERSE | | | | × | × | ○ | G | M |

FIG. 14

| BEFORE CHANGE \ AFTER CHANGE | | | SERIES MODE (a) | SERIES-PARALLEL MODE | | | PARALLEL MODE | |
|---|---|---|---|---|---|---|---|---|
| | | | | Lo (b) | Hi (c) | Lo (d) | Hi (e) |
| SERIES MODE (A) | | C1 | | x→○ | x | x→○ | x |
| | | B1 | | x | x→○ | x | x→○ |
| | | Cs | | ○→x | ○→x | ○ | ○ |
| | | Tm1 | | ○→x | ○→x | ○→x | ○→x |
| | | sum | | 3 | 3 | 2 | 2 |
| | | SYNCHRONIZATION | | ALLOWED | ALLOWED | ALLOWED | ALLOWED |
| SERIES-PARALLEL MODE | Lo (B) | C1 | ○→x | | ○→x | ○ | ○→x |
| | | B1 | x | | x→○ | x | x→○ |
| | | Cs | x→○ | | x | x→○ | x→○ |
| | | Tm1 | ○→x | | ○ | ○→x | ○→x |
| | | sum | 3 | | 3 | 2 | 2 |
| | | SYNCHRONIZATION | ALLOWED | | NOT ALLOWED | ALLOWED | ALLOWED |
| | Hi (C) | C1 | x | x→○ | | ○→x | ○→x |
| | | B1 | ○→x | ○→x | | x | x→○ |
| | | Cs | x→○ | x→○ | | x→○ | x→○ |
| | | Tm1 | ○→x | ○→○ | | ○→x | ○→x |
| | | sum | 2 | 2 | | 4 | 4 |
| | | SYNCHRONIZATION | ALLOWED | NOT ALLOWED | | NOT ALLOWED | NOT ALLOWED |
| PARALLEL MODE | Lo (D) | C1 | ○→x | x→○ | x | | x→○ |
| | | B1 | x | ○→x | ○ | | x→○ |
| | | Cs | ○ | ○→x | ○→x | | ○→x |
| | | Tm1 | x→○ | x→○ | x→○ | | ○→x |
| | | sum | 2 | 4 | 4 | | 2 |
| | | SYNCHRONIZATION | ALLOWED | NOT ALLOWED | NOT ALLOWED | | ALLOWED |
| | Hi (E) | C1 | x | x→○ | x | x→○ | |
| | | B1 | ○→x | x→○ | ○ | ○ | |
| | | Cs | ○ | ○→x | ○→x | x | |
| | | Tm1 | x→○ | x→○ | ○→x | ○ | |
| | | sum | 2 | 4 | 2 | 2 | |
| | | SYNCHRONIZATION | ALLOWED | NOT ALLOWED | NOT ALLOWED | NOT ALLOWED | |

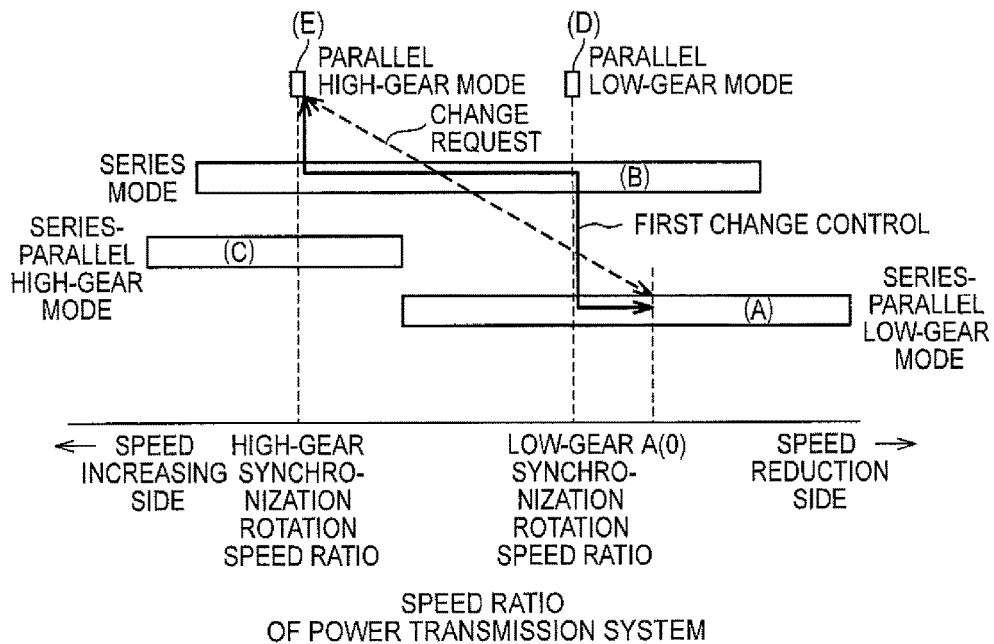
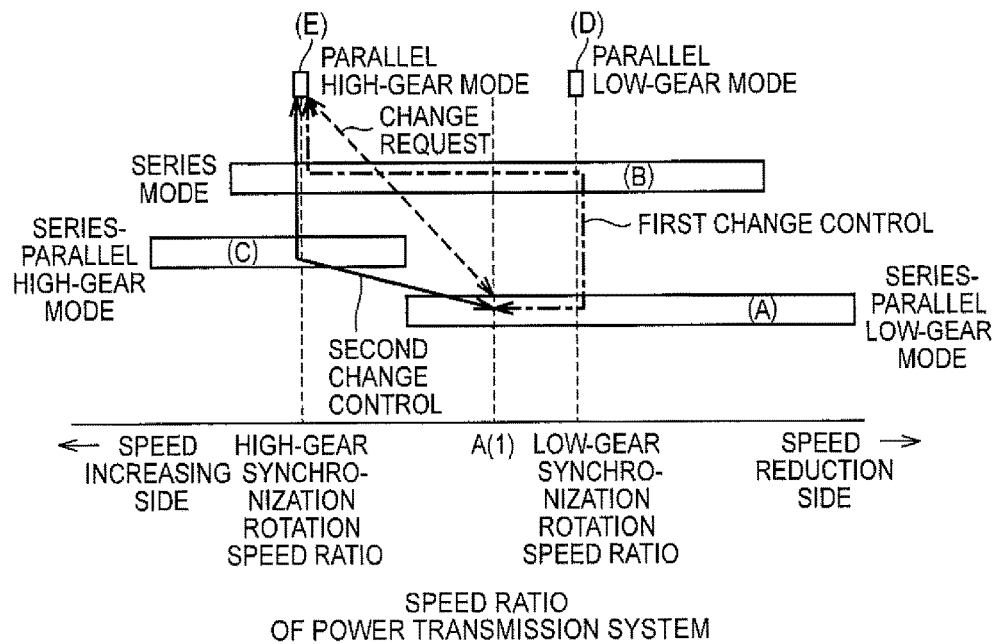

HYBRID VEHICLE

INCORPORATION BY REFERENCE

The disclosure of Japanese Patent Application No. 2015-106323 filed on May 26, 2015 including the specification, drawings and abstract is incorporated herein by reference in its entirety.

BACKGROUND

1. Technical Field

The disclosure relates to a hybrid vehicle including first and second rotary electric machines and a transmission.

2. Description of Related Art

A hybrid vehicle is known that includes an engine, two rotary electric machines, a power split mechanism and a transmission unit between the engine and the power split mechanism.

A series-parallel hybrid system is employed in the vehicle described in International Application Publication No. 2013/114594. In the series-parallel hybrid vehicle, power of an engine is transmitted to a first motor generator (first MG) and is used to generate electric power, while part of the power of the engine is also transmitted to drive wheels via a power split mechanism.

There is also known a hybrid vehicle configured to travel in series mode in which electric power is generated by using power of an engine, and a motor is driven by using the generated electric power (series hybrid system). In the series hybrid system, the power of the engine is not transmitted to drive wheels.

In the vehicle described in the International Application Publication No. 2013/114594, when the power of the engine is transmitted to the first motor generator (first MG), the power is also transmitted to the drive wheels via the power split mechanism, so the vehicle is configured not to be able to travel in series mode.

SUMMARY

In the series-parallel hybrid system, there is a concern that tooth contact noise occurs in a gear mechanism provided in a drive system between the engine and the drive wheels due to engine torque fluctuations, for example, when the vehicle travels at a low vehicle speed. Therefore, it is required to select the operating point of the engine such that no tooth contact noise occurs, and there is a case where the engine is operated at an operating point that is not optimal in terms of fuel economy, so there is room for improvement in fuel economy.

On the other hand, in the series system, the engine is completely separated from the gear mechanism provided in the drive system, so it is not necessary to consider such tooth contact noise so much. However, all the torque of the engine is once converted to electric power and is then converted to the torque of the drive wheels again with the use of the motor, so the series hybrid system is lower in fuel economy in a speed range in which the operating efficiency of the engine is high than the series-parallel hybrid system.

Due to these factors, there is a point in which traveling using the series-parallel hybrid system (hereinafter, also referred to as series-parallel traveling) is more excellent than traveling using the series hybrid system (hereinafter, referred to as series traveling). Therefore, it is desirable to be able to change a drive mode between a mode in which the vehicle performs series traveling (hereinafter, also referred to as series mode) and a mode in which the vehicle performs series-parallel traveling (hereinafter, also referred to as series-parallel mode) depending on the state of the vehicle.

It is presumable to change the drive mode by changing the statuses of engagement elements, such as clutches. In such a case, if a change in both the drive mode and the speed ratio of the transmission unit is performed at the same time in response to a request to change the drive mode and the speed ratio of the transmission unit, the number of objects to be controlled at the same time increases, so there is a concern that control becomes complex.

The embodiments provide a hybrid vehicle that executes simplified control in the case where a request to change a drive mode and a speed ratio of a transmission has been issued.

Embodiments provide a hybrid vehicle that includes an internal combustion engine, a first rotary electric machine, a second rotary electric machine, a transmission, a differential unit, a clutch and an electronic control unit.

The second rotary electric machine is configured to output power to a drive wheel. The transmission includes an input element configured to receive power from the internal combustion engine and an output element configured to output power. The transmission is configured to switch between a non-neutral state where power is transmitted between the input element and the output element in either one of a low speed stage and a high speed stage, and a neutral state where power is not transmitted between the input element and the output element.

The differential unit includes a first rotating element, a second rotating element and a third rotating element. The first rotating element is connected to the first rotary electric machine. The second rotating element is connected to the second rotary electric machine and the drive wheel. The third rotating element is connected to the output element. The differential unit is configured such that, when rotation speeds of any two of the first rotating element, the second rotating element and the third rotating element are determined, a rotation speed of a remaining one of the first rotating element, the second rotating element and the third rotating element is determined.

The clutch is provided in a second path through which power is transmitted from the internal combustion engine to the first rotary electric machine, the second path being different from a first path through which power is transmitted from the internal combustion engine to the first rotary electric machine via the transmission and the differential unit. The clutch is configured to switch between an engaged state where power is transmitted from the internal combustion engine through the second path to the first rotary electric machine and a released state where transmission of power from the internal combustion engine through the second path to the first rotary electric machine is interrupted.

The electronic control unit is configured to change a drive mode among a series-parallel mode, a parallel mode and a series mode. The electronic control unit is configured to control the clutch and the transmission in the series-parallel mode such that the clutch is set to the released state and the transmission is set to the non-neutral state. The electronic control unit is configured to control the clutch and the transmission in the parallel mode such that the clutch is set to the engaged state and the transmission is set to the non-neutral state. The electronic control unit is configured to control the clutch and the transmission in the series mode such that the clutch is set to the engaged state and the transmission is set to the neutral state.

The electronic control unit is further configured to, when the drive mode is changed from one of the series-parallel mode and the parallel mode to the other one of the series-parallel mode and the parallel mode and the speed stage is changed from one of the low speed stage and the high speed stage to the other one of the low speed stage and the high speed stage, selectively execute either one of a first control and a second control. The first control is control in which the drive mode and the speed stage are changed by passing through the series mode. The second control is control in which one of the drive mode and the speed stage is changed and then the other one of the drive mode and the speed stage is changed without passing through the series mode.

With the hybrid vehicle according to the above aspect, when the drive mode is changed from one of the series-parallel mode and the parallel mode to the other one of the series-parallel mode and the parallel mode and the speed stage is changed from one of the low speed stage and the high speed stage to the other one of the low speed stage and the high speed stage, any one of the first control and the second control is selectively executed. In the first control, because the drive mode and the speed stage are changed by passing through the series mode in which the transmission is set to the neutral state, the number of objects that are controlled at the same time reduces as compared to when both the changes are performed at the same time without passing through the series mode, so control is simplified. In the second control, because one of the drive mode and the speed stage is changed and then the other one of the drive mode and the speed stage is changed without passing through the series mode, the number of objects that are controlled at the same time reduces as compared to when both the drive mode and the speed stage are changed at the same time, so control is simplified. Therefore, even when any one of the first control and the second control is selected, it is possible to simplify control. In addition, it is possible to appropriately select any one of the first control via (by passing through) the series mode and the second control without passing through the series mode in response to the state of the vehicle.

In the hybrid vehicle according to the above aspect, the electronic control unit may be configured to execute the second control when it is predicted that executing the first control will cause a rotation speed ratio between the input element of the transmission and the second rotating element of the differential unit to change in both a speed reduction direction and in a speed increasing direction. The electronic control unit may be configured to execute the first control when it is predicted that executing the first control will cause the rotation speed ratio to change in one of the speed reduction direction and the speed increasing direction.

According to this aspect, it is possible to suppress an increase or reduction in rotation speed ratio at the time of changing the drive mode and the speed stage. Therefore, it is possible to suppress deterioration of drivability of the vehicle.

In the hybrid vehicle according to the above aspect, the electronic control unit may be configured to prestore the rotation speed ratio at the time when the one of the low speed stage and the high speed stage is established in the parallel mode, as a first synchronization rotation speed ratio. The electronic control unit may be configured to prestore the rotation speed ratio at the time when the other one of the low speed stage and the high speed stage is established in the parallel mode, as a second synchronization rotation speed ratio. The electronic control unit may be configured to, when the drive mode is changed from the series-parallel mode to the parallel mode and the speed stage is changed from the one of the low speed stage and the high speed stage to the other one of the low speed stage and the high speed stage, and when an actual value of the rotation speed ratio falls between the first synchronization rotation speed ratio and the second synchronization rotation speed ratio, predict that the rotation speed ratio changes in both the speed reduction direction and the speed increasing direction in a case where the electronic control unit executes the first control.

According to this aspect, when the drive mode is changed from the series-parallel mode to the parallel mode and the speed stage is changed from the one of the low speed stage and the high speed stage to the other one of the low speed stage and the high speed stage, and when the actual value of the rotation speed ratio falls between the first synchronization rotation speed ratio and the second synchronization rotation speed ratio, the second control is executed. Therefore, it is possible to appropriately suppress an increase or reduction in rotation speed ratio at the time of changing the drive mode and the speed stage.

In the hybrid vehicle according to the above aspect, the first control may be control in which (1) the rotation speed ratio is synchronized with the first synchronization rotation speed ratio in the series-parallel mode, (2) then the drive mode is changed to the series mode, (3) then the rotation speed ratio is synchronized with the second synchronization rotation speed ratio in the series mode, (4) then the drive mode is changed to the parallel mode and the speed stage is changed to the other one of the low speed stage and the high speed stage. The second control may be control in which the drive mode is changed from the parallel mode to the series-parallel mode and then the speed stage is changed from the one of the low speed stage and the high speed stage to the other one of the low speed stage and the high speed stage.

According to this aspect, in the first control, because control for synchronizing the rotation speed ratio with the rotation speed ratio after the change is executed before changing the drive mode and the speed stage, it is possible to suppress occurrence of a shock due to the change. In the second control, because the speed stage is changed and then the drive mode is changed from the series-parallel mode to the parallel mode, it is possible to simplify control.

In the hybrid vehicle according to the above aspect, the electronic control unit may be configured to prestore the rotation speed ratio at the time when the one of the low speed stage and the high speed stage is established in the parallel mode, as a first synchronization rotation speed ratio. The electronic control unit may be configured to prestore the rotation speed ratio at the time when the other one of the low speed stage and the high speed stage is established in the parallel mode, as a second synchronization rotation speed ratio. The electronic control unit may be configured to, when the drive mode is changed from the parallel mode to the series-parallel mode and the speed stage is changed from the one of the low speed stage and the high speed stage to the other one of the low speed stage and the high speed stage, and when a target value of the rotation speed ratio falls between the first synchronization rotation speed ratio and the second synchronization rotation speed ratio, predict that the rotation speed ratio changes in both the speed reduction direction and the speed increasing direction in a case where the electronic control unit executes the first control.

According to this aspect, when the drive mode is changed from the parallel mode to the series-parallel mode and the speed stage is changed from the one of the low speed stage and the high speed stage to the other one of the low speed stage and the high speed stage, and when the target value of the rotation speed ratio falls between the first synchronization rotation speed ratio and the second synchronization rotation speed ratio, the second control is executed. Therefore, it is possible to appropriately suppress an increase or reduction in rotation speed ratio at the time of changing the drive mode and the speed stage.

In the hybrid vehicle according to the above aspect, the first control may be control in which (1) the drive mode is changed from the parallel mode to the series mode, (2) then the rotation speed ratio is synchronized with the second synchronization rotation speed ratio in the series mode, (3) then the drive mode is changed to the series-parallel mode and the speed stage is changed to the other one of the low speed stage and the high speed stage. The second control may be control in which the drive mode is changed from the parallel mode to the series-parallel mode and then the speed stage is changed from the one of the low speed stage and the high speed stage to the other one of the low speed stage and the high speed stage.

According to the above aspect, in the first control, because control for synchronizing the rotation speed ratio with the rotation speed ratio after the change is executed before changing the drive mode and the speed stage, it is possible to suppress occurrence of a shock due to the change. In the second control, because the drive mode is changed from the parallel mode to the series-parallel mode and then the speed stage is changed, it is possible to simplify control.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is an operation engagement chart that shows the correspondence relationship between a traveling state of the vehicle and controlled statuses of a clutch C1, brake B1 and clutch CS;

FIG. 14 is a table that shows changes in controlled objects resulting from a change in the control mode;

FIG. 15 shows a change in the speed ratio of a power transmission system in the case where the control mode is changed between the series-parallel low-gear mode and the parallel high-gear mode by the use of first change control;

FIG. 16 shows a change in the speed ratio of the power transmission system in the case where the control mode is changed between the series-parallel low-gear mode and the parallel high-gear mode by the use of second change control;

DETAILED DESCRIPTION OF EMBODIMENTS

Figure 1:
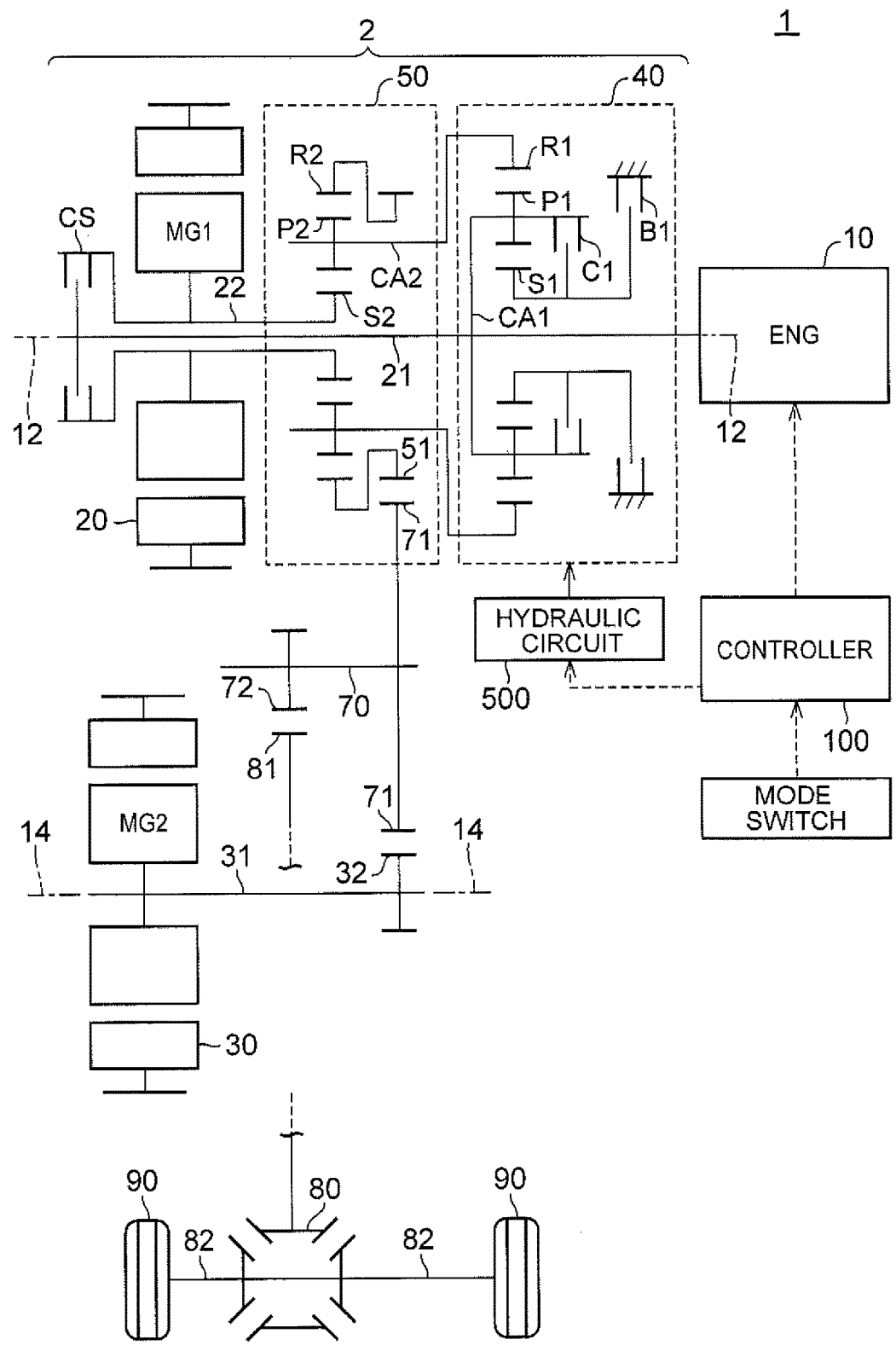
FIG. 1 is a view that shows the overall configuration of a vehicle.

Hereinafter, an embodiment will be described with reference to the accompanying drawings. Like reference numerals denote the same or corresponding portions in the following embodiment, and the description thereof will not be repeated.

Overall Configuration of Hybrid Vehicle

FIG. 1 is a view that shows the overall configuration of a vehicle 1 according to an embodiment. The vehicle 1 includes an engine 10, a drive system 2, drive wheels 90 and a controller 100. The drive system 2 includes a first motor generator (hereinafter, referred to as first MG) 20, a second motor generator (hereinafter, referred to as second MG) 30, a transmission unit 40, a differential unit 50, a clutch CS, an input shaft 21, an output shaft (counter shaft) 70, a differential gear 80 and a hydraulic circuit 500.

The vehicle 1 is a front-engine front-drive (FF) hybrid vehicle that travels by using the power of at least any one of the engine 10, the first MG 20 and the second MG 30. The vehicle 1 may be a plug-in hybrid vehicle of which an in-vehicle battery (not shown) is rechargeable from an external power supply.

The engine 10 is, for example, an internal combustion engine, such as a gasoline engine or a diesel engine.

Each of the first MG 20 and the second MG 30 is, for example, a permanent magnet synchronous motor that includes a rotor in which permanent magnets are embedded. The drive system 2 is a double-axis drive system in which the first MG 20 is provided along a first axis 12 coaxial with the crankshaft (output shaft) of the engine 10 and the second MG 30 is provided along a second axis 14 different from the first axis 12. The first axis 12 and the second axis 14 are parallel to each other.

The transmission unit 40, the differential unit 50 and the clutch CS are further provided along the first axis 12. The transmission unit 40, the differential unit 50, the first MG 20 and the clutch CS are arranged from the side close to the engine 10 in the stated order.

The first MG 20 is provided such that power from the engine 10 is inputable to the first MG 20. More specifically, the input shaft 21 of the drive system 2 is connected to the crankshaft of the engine 10. The input shaft 21 extends along the first axis 12 in a direction away from the engine 10. The input shaft 21 is connected to the clutch CS at its distal end extending from the engine 10. A rotary shaft 22 of the first MG 20 extends in a cylindrical shape along the first axis 12. The input shaft 21 passes through the inside of the rotary shaft 22 at a portion before the input shaft 21 is connected to the clutch CS. The input shaft 21 is connected to the rotary shaft 22 of the first MG 20 via the clutch CS.

The clutch CS is provided in the power transmission path from the engine 10 to the first MG 20. The clutch CS is a hydraulic friction engagement element that is able to couple the input shaft 21 to the rotary shaft 22 of the first MG 20. When the clutch CS is placed in an engaged state, the input shaft 21 and the rotary shaft 22 are coupled to each other, and transmission of power from the engine 10 to the first MG 20 is allowed. When the clutch CS is placed in a released state, coupling of the input shaft 21 to the rotary shaft 22 is released, and transmission of power from the engine 10 to the first MG 20 via the clutch CS is interrupted.

The transmission unit 40 shifts power from the engine 10 and then outputs the power to the differential unit 50. The transmission unit 40 includes a single-pinion-type planetary gear mechanism, a clutch C1 and a brake B1. The single-pinion-type planetary gear mechanism includes a sun gear S1, pinion gears P1, a ring gear R1 and a carrier CA1.

The sun gear S1 is provided such that the rotation center of the sun gear S1 coincides with the first axis 12. The ring gear R1 is provided coaxially with the sun gear S1 on the radially outer side of the sun gear S1. The pinion gears P1 are arranged between the sun gear S1 and the ring gear R1, and are in mesh with the sun gear S1 and the ring gear R1. The pinion gears P1 are rotatably supported by the carrier CA1. The carrier CA1 is connected to the input shaft 21, and rotates integrally with the input shaft 21. Each of the pinion gears P1 is provided so as to be revolvable about the first axis 12 and rotatable around the central axis of the pinion gear P1.

As shown in FIG. 5 to FIG. 11 (described later), the rotation speed of the sun gear S1, the rotation speed of the carrier CA1 (that is, the rotation speed of the engine 10) and the rotation speed of the ring gear R1 are in the relationship represented by points that are connected by a straight line in each of the nomographs (that is, the relationship that, when any two rotation speeds are determined, the remaining one rotation speed is also determined).

In the present embodiment, the carrier CA1 is provided as an input element to which power is input from the engine 10, and the ring gear R1 is provided as an output element that outputs the power input to the carrier CA1. By the use of the planetary gear mechanism including the sun gear S1, the pinion gears P1, the ring gear R1 and the carrier CA1, power input to the carrier CA1 is shifted and output from the ring gear R1.

The clutch C1 is a hydraulic friction engagement element that is able to couple the sun gear S1 to the carrier CA1. When the clutch C1 is placed in an engaged state, the sun gear S1 and the carrier CA1 are coupled to each other, and rotate integrally with each other. When the clutch C1 is placed in a released state, integral rotation of the sun gear S1 and the carrier CA1 is cancelled.

The brake B1 is a hydraulic friction engagement element that is able to restrict (lock) the rotation of the sun gear S1. When the brake B1 is placed in an engaged state, the sun gear S1 is fixed to the case body of the drive system, and the rotation of the sun gear S1 is restricted. When the brake B1 is placed in a released state (disengaged state), the sun gear S1 is separated from the case body of the drive system, and the rotation of the sun gear S1 is allowed.

A speed ratio (the ratio of the rotation speed of the carrier CA1 that is the input element to the rotation speed of the ring gear R1 that is the output element, specifically, Rotation Speed of Carrier CA1/Rotation Speed of Ring Gear R1) of the transmission unit 40 is changed in response to a combination of the engaged/released states of the clutch C1 and brake B1. When the clutch C1 is engaged and the brake B1 is released, a low gear stage Lo in which the speed ratio is 1.0 (directly coupled state) is established. When the clutch C1 is released and the brake B1 is engaged, a high gear stage Hi in which the speed ratio is smaller than 1.0 (for example, 0.7, and a so-called over-drive state) is established. When the clutch C1 is engaged and the brake B1 is engaged, the rotation of the sun gear S1 and the rotation of the carrier CA1 are restricted, so the rotation of the ring gear R1 is also restricted.

The transmission unit 40 is configured to be able to switch between a non-neutral state and a neutral state. In the non-neutral state, power is transmitted. In the neutral state, power is not transmitted. In the present embodiment, the above-described directly coupled state and over-drive state correspond to the non-neutral state. On the other hand, when both the clutch C1 and the brake B1 are released, the carrier CA1 is allowed to coast about the first axis 12. Thus, the neutral state in which power transmitted from the engine 10 to the carrier CA1 is not transmitted from the carrier CA1 to the ring gear R1 is obtained.

The differential unit 50 includes a single-pinion-type planetary gear mechanism and a counter drive gear 51. The single-pinion-type planetary gear mechanism includes a sun gear S2, pinion gears P2, a ring gear R2 and a carrier CA2.

The sun gear S2 is provided such that the rotation center of the sun gear S2 coincides with the first axis 12. The ring gear R2 is provided coaxially with the sun gear S2 on the radially outer side of the sun gear S2. The pinion gears P2 are arranged between the sun gear S2 and the ring gear R2, and are in mesh with the sun gear S2 and the ring gear R2. The pinion gears P2 are rotatably supported by the carrier CA2. The carrier CA2 is connected to the ring gear R1 of the transmission unit 40, and rotates integrally with the ring gear R1. Each of the pinion gears P2 is provided so as to be revolvable about the first axis 12 and rotatable around the central axis of the pinion gear P2.

The rotary shaft 22 of the first MG 20 is connected to the sun gear S2. The rotary shaft 22 of the first MG 20 rotates integrally with the sun gear S2. The counter drive gear 51 is connected to the ring gear R2. The counter drive gear 51 is an output gear of the differential unit 50. The output gear rotates integrally with the ring gear R2.

As shown in FIG. 5 to FIG. 11 (described later), the rotation speed of the sun gear S2 (that is, the rotation speed of the first MG 20), the rotation speed of the carrier CA2 and the rotation speed of the ring gear R2 are in the relationship represented by points that are connected by a straight line in each of the nomographs (that is, the relationship that, when any two rotation speeds are determined, the remaining one rotation speed is also determined). Therefore, when the rotation speed of the carrier CA2 is a predetermined value, it is possible to steplessly change the rotation speed of the ring gear R2 by adjusting the rotation speed of the first MG 20.

In the present embodiment, the case where the differential unit 50 is formed of the planetary gear mechanism is described. However, the differential unit 50 is not limited to this configuration. Any configuration of the differential unit 50 is applicable as long as the differential unit 50 is configured such that, when the rotation speeds of any two of three rotating elements is determined, the rotation speed of the remaining one of the three rotating elements is determined. For example, the differential unit 50 may be formed of a differential gear.

The output shaft (counter shaft) 70 extends parallel to the first axis 12 and the second axis 14. The output shaft (counter shaft) 70 is arranged parallel to the rotary shaft 22 of the first MG 20 and a rotary shaft 31 of the second MG 30. A driven gear 71 and a drive gear 72 are provided on the output shaft (counter shaft) 70. The driven gear 71 is in mesh with the counter drive gear 51 of the differential unit 50. That is, the power of the engine 10 and the power of the first MG 20 are transmitted to the output shaft (counter shaft) 70 via the counter drive gear 51 of the differential unit 50.

The transmission unit 40 and the differential unit 50 are connected in series with each other in a power transmission path from the engine 10 to the output shaft (counter shaft) 70. Therefore, power from the engine 10 is shifted in the transmission unit 40 and the differential unit 50 and then transmitted to the output shaft (counter shaft) 70.

The driven gear 71 is in mesh with a reduction gear 32 connected to the rotary shaft 31 of the second MG 30. That is, the power of the second MG 30 is transmitted to the output shaft (counter shaft) 70 via the reduction gear 32.

The drive gear 72 is in mesh with a differential ring gear 81 of the differential gear 80. The differential gear 80 is connected to the right and left drive wheels 90 via corresponding right and left drive shafts 82. That is, the rotation of the output shaft (counter shaft) 70 is transmitted to the right and left drive shafts 82 via the differential gear 80.

With the above-described configuration in which the clutch CS is provided, the vehicle 1 is allowed to operate in series-parallel mode and is also allowed to operate in series mode. In terms of this point, the manner in which the power from the engine is transmitted in each individual mode will be described with reference to the schematic view shown in FIG. 2.

Figure 2:
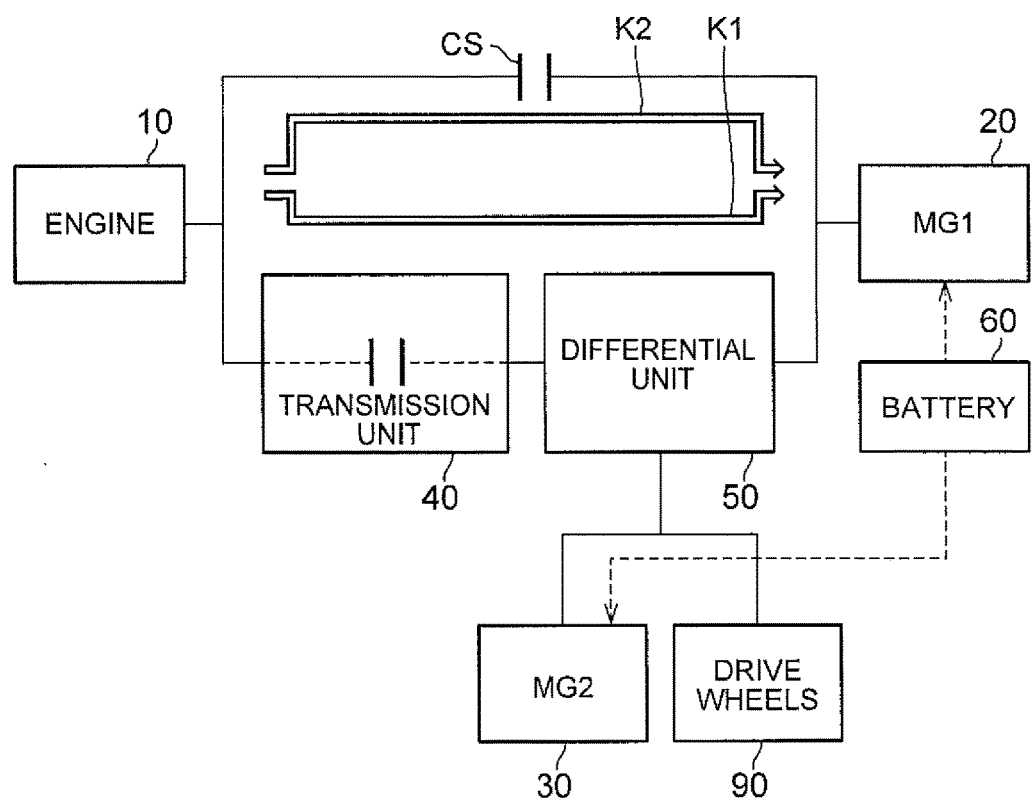
FIG. 2 is a block diagram that schematically shows power transmission paths of components of the vehicle.

FIG. 2 is a block diagram that schematically shows power transmission paths of components of the vehicle in FIG. 1. As shown in FIG. 2, the vehicle 1 includes the engine 10, the first MG 20, the second MG 30, the transmission unit 40, the differential unit 50, a battery 60 and the clutch CS.

The second MG 30 is provided so as to be able to output power to the drive wheels 90. The transmission unit 40 includes the input element and the output element. The power of the engine 10 is input to the input element. The output element outputs the power input to the input element. The transmission unit 40 is configured to be able to switch between the non-neutral state and the neutral state. In the non-neutral state, power is transmitted between the input element and the output element. In the neutral state, power is not transmitted between the input element and the output element.

The battery 60 supplies electric power to the first MG 20 or the second MG 30 during motoring performed by a corresponding one of the first MG 20 and the second MG 30, and stores electric power generated by the first MG 20 or the second MG 30 during regeneration performed by a corresponding one of the first MG 20 and the second MG 30.

The differential unit 50 includes a first rotating element, a second rotating element and a third rotating element. The first rotating element is connected to the first MG 20. The second rotating element is connected to the second MG 30 and the drive wheels 90. The third rotating element is connected to the output element of the transmission unit 40. The differential unit 50 is configured as in the case of, for example, the planetary gear mechanism, or the like, such that, when the rotation speeds of any two of the first to third rotating elements are determined, the rotation speed of the remaining one of the first to third rotating elements is determined.

The vehicle 1 is configured to be able to transmit power from the engine 10 to the first MG 20 with the use of at least any one of two paths K1, K2 through which power is transmitted. The path K1 is a path through which power is transmitted from the engine 10 to the first MG 20 via the transmission unit 40 and the differential unit 50. The path K2 is a path through which power is transmitted from the engine 10 to the first MG 20 via a path different from the path K1. The clutch CS is provided in the path K2, and is able to switch between the engaged state and the released state. In the engaged state, power is transmitted from the engine 10 to the first MG 20 through path K2. In the released state, transmission of power from the engine 10 to the first MG 20 through path K2 is interrupted.

In HV mode in which the engine is operated, any one of the clutch C1 and the brake B1 is placed in the engaged state, and the other one of the clutch C1 and the brake B1 is placed in the released state. Thus, when the transmission unit 40 is controlled to the non-neutral state, power is transmitted from the engine 10 to the first MG 20 through the path K1. At this time, when the clutch CS is placed in the released state to interrupt the path K2 at the same time, the vehicle is operable in series-parallel mode.

On the other hand, in HV mode in which the engine is operated, when power is transmitted through the path K2 by directly coupling the engine 10 to the first MG 20 being engaged the clutch CS, the path K1 is interrupted by controlling the transmission unit 40 such that the transmission unit 40 is placed in the neutral state by placing both the clutch C1 and the brake B1 in the released state, the vehicle is operable in series mode. At this time, in the differential unit 50, the rotating element connected to the transmission unit 40 is freely rotatable, so the other two rotating elements do not influence each other and are rotatable. Therefore, it is possible to independently perform the operation of generating electric power by rotating the first MG 20 by the use of the rotation of the engine 10 and the operation of rotating the drive wheels by driving the second MG 30 by the use of generated electric power or electric power charged in the battery 60.

The transmission unit 40 does not always need to be able to change the speed ratio. As long as it is possible to interrupt transmission of power between the engine 10 and the differential unit 50 in the path K1, a mere clutch can be used.

Figure 3:
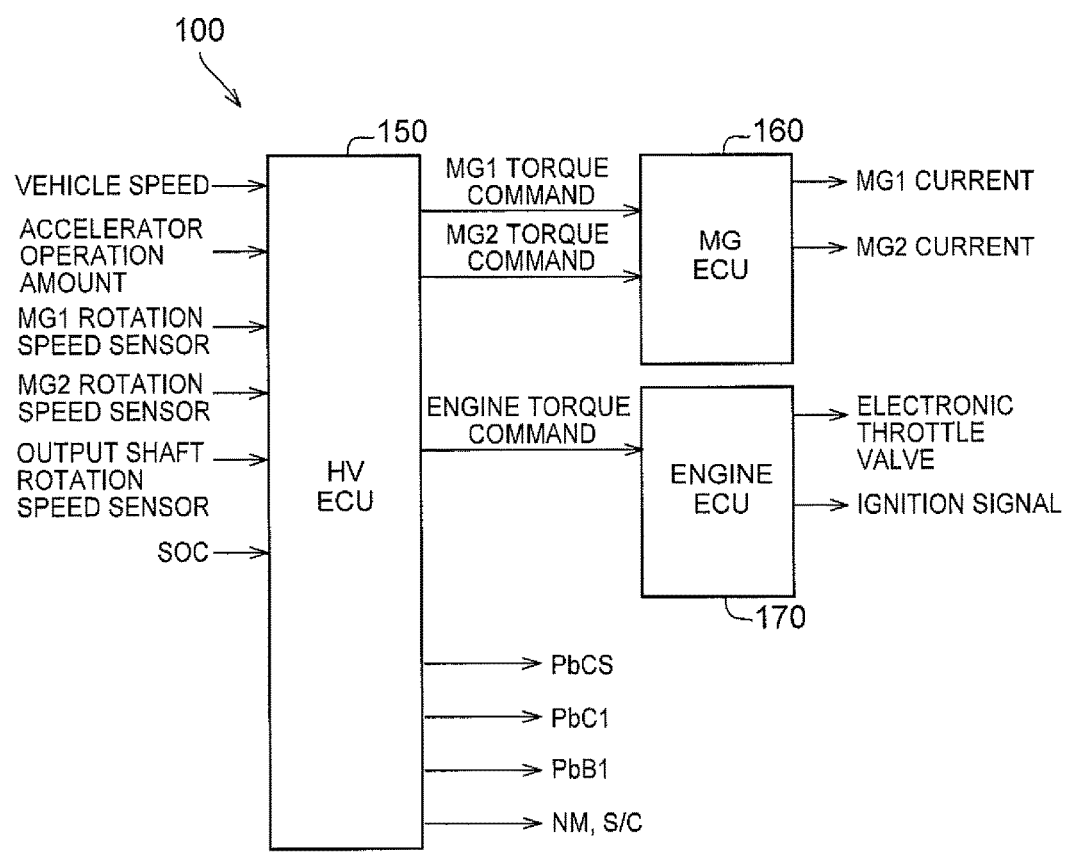
FIG. 3 is a block diagram that shows the configuration of a controller for the vehicle.

FIG. 3 is a block diagram that shows the configuration of the controller 100 of the vehicle shown in FIG. 1. As shown in FIG. 3, the controller 100 includes an HV ECU 150, an MG ECU 160 and an engine ECU 170. Each of the HV ECU 150, the MG ECU 160 and the engine ECU 170 is an electronic control unit including a computer (having a central processing unit (CPU) and memory). The number of ECUs is not limited to three. An integrated single ECU may be provided as a whole, or two or four or more of divided ECUs may be provided.

The MG ECU 160 controls the first MG 20 and the second MG 30. The MG ECU 160, for example, controls the output torque of the first MG 20 by adjusting the value of current that is supplied to the first MG 20, and controls the output torque of the second MG 30 by adjusting the value of current that is supplied to the second MG 30.

The engine ECU 170 controls the engine 10. The engine ECU 170, for example, controls the opening degree of an electronic throttle valve of the engine 10, controls ignition of the engine by outputting an ignition signal, or controls injection of fuel to the engine 10. The engine ECU 170 controls the output torque of the engine 10 through opening degree control over the electronic throttle valve, injection control, ignition control, and the like.

The HV ECU 150 comprehensively controls the entire vehicle. A vehicle speed sensor, an accelerator operation amount sensor, an MG1 rotation speed sensor, an MG2 rotation speed sensor, an output shaft rotation speed sensor, a battery sensor, and the like, are connected to the HV ECU 150. With these sensors, the HV ECU 150 acquires a vehicle speed, an accelerator operation amount, the rotation speed of the first MG 20, the rotation speed of the second MG 30, the rotation speed of the counter shaft 70, a battery state SOC (state-of-charge), and the like.

The HV ECU 150 calculates a required driving force, a required power, a required torque, and the like, for the vehicle on the basis of acquired information. The HV ECU 150 determines the output torque of the first MG 20 (hereinafter, also referred to as MG1 torque Tm1), the output torque of the second MG 30 (hereinafter, also referred to as MG2 torque Tm2) and the output torque of the engine 10 (hereinafter, also referred to as engine torque Te) on the basis of the calculated required values. The HV ECU 150 outputs a command value of the MG1 torque Tm1 and a command value of the MG2 torque Tm2 to the MG ECU 160. The HV ECU 150 outputs a command value of the engine torque Te to the engine ECU 170.

The HV ECU 150 controls the clutches C1, CS and the brake B1 on the basis of the drive mode (described later), and the like. The HV ECU 150 outputs, to the hydraulic circuit 500 shown in FIG. 1, a command value (PbC1) of hydraulic pressure that is supplied to the clutch C1, a command value (PbCS) of hydraulic pressure that is supplied to the clutch CS and a command value (PbB1) of hydraulic pressure that is supplied to the brake B1. The HV ECU 150 outputs a control signal NM and a control signal S/C to the hydraulic circuit 500 shown in FIG. 1.

The hydraulic circuit 500 shown in FIG. 1 controls hydraulic pressures that are respectively supplied to the clutch C1 and the brake B1 in response to the command values PbC1, PbB1, controls an electric oil pump in response to the control signal NM, and controls whether to allow or prohibit simultaneous engagement of the clutch C1, the brake B1 and the clutch CS in response to the control signal S/C.

Control Mode of Hybrid Vehicle

Hereinafter, the details of control modes of the vehicle 1 will be described with reference to an operation engagement chart and the nomographs.

FIG. 4 is an operation engagement chart that shows the correspondence relationship between a traveling state of the vehicle 1 and controlled statuses of the clutch C1, brake B1 and clutch CS.

The controller 100 causes the vehicle 1 to travel in motor drive mode (hereinafter, referred to as EV mode) or hybrid mode (hereinafter, referred to as HV mode). The EV mode is a control mode in which the engine 10 is stopped and the vehicle 1 is caused to travel by using the power of at least one of the first MG 20 and the second MG 30. The HV mode is a control mode in which the vehicle 1 is caused to travel by using the power of the engine 10 and the power of the second MG 30. An engine drive mode may be added to these control modes. In engine drive mode, the first MG 20 and the second MG 30 are not used and the vehicle is caused to travel by using the driving force of the engine 10. Each of the EV mode and the HV mode is further divided into some control modes.

In FIG. 4, C1, B1, CS, MG1 and MG2 respectively denote the clutch C1, the brake B1, the clutch CS, the first MG 20 and the second MG 30. The circle mark (○) in each of the C1, B1, CS columns indicates the engaged state, the cross mark (x) indicates the released state, and the triangle mark (Δ) indicates that any one of the clutch C1 and the brake B1 is engaged during engine brake. The sign G in each of the MG1 column and the MG2 column indicates that the MG1 or the MG2 is mainly operated as a generator. The sign M in each of the MG1 column and the MG2 column indicates that the MG1 or the MG2 is mainly operated as a motor.

In EV mode, the controller 100 selectively changes the drive mode between one-motor mode and two-motor mode in response to a user's required torque, and the like. In one-motor mode, the vehicle 1 is caused to travel by using the power of the second MG 30 alone. In two-motor mode, the vehicle 1 is caused to travel by using the power of both the first MG 20 and the second MG 30.

When the load of the drive system 2 is low, the one-motor mode is used. When the load of the drive system 2 becomes high, the drive mode is changed to the two-motor mode.

As shown in E1 line of FIG. 4, when the vehicle 1 is driven (moved forward or reversed) in one-motor EV mode, the controller 100 places the transmission unit 40 in the neutral state (state where no power is transmitted) by releasing the clutch C1 and releasing the brake B1. At this time, the controller 100 causes the first MG 20 to mainly operate as fixing means for fixing the rotation speed of the sun gear S2 to zero and causes the second MG 30 to mainly operate as a motor (see FIG. 5 (described later)). In order to cause the first MG 20 to operate as the fixing means, the current of the first MG 20 may be controlled by feeding back the rotation speed of the first MG 20 such that the rotation speed becomes zero. When the rotation speed of the first MG 20 is kept zero even when torque is zero, cogging torque may be utilized without adding current. When the transmission unit 40 is placed in the neutral state, the engine 10 is not co-rotated during regenerative braking, so a loss is smaller by that amount, and it is possible to recover large regenerated electric power.

As shown in the E2 line in FIG. 4, when the vehicle 1 is braked in one-motor EV mode and engine brake is required, the controller 100 engages any one of the clutch C1 and the brake B1. For example, when braking force is insufficient with only regenerative brake, engine brake is used together with regenerative brake. For example, when the SOC of the battery 60 is close to a full charge state, regenerated electric power cannot be charged, so it is conceivable to establish an engine brake state.

By engaging any one of the clutch C1 and the brake B1, a so-called engine brake state is established. In the engine brake state, the rotation of the drive wheels 90 is transmitted to the engine 10, and the engine 10 is rotated. At this time, the controller 100 causes the first MG 20 to mainly operate as a motor, and causes the second MG 30 to mainly operate as a generator.

On the other hand, as shown in the E3 line in FIG. 4, when the vehicle 1 is driven (moved forward or reversed) in two-motor EV mode, the controller 100 restricts (locks) the rotation of the ring gear R1 of the transmission unit 40 by engaging the clutch C1 and engaging the brake B1. Thus, the rotation of the carrier CA2 of the differential unit 50 coupled to the ring gear R1 of the transmission unit 40 is also restricted (locked), so the carrier CA2 of the differential unit 50 is kept in a stopped state (Engine Rotation Speed Ne=0).

Figure 6:
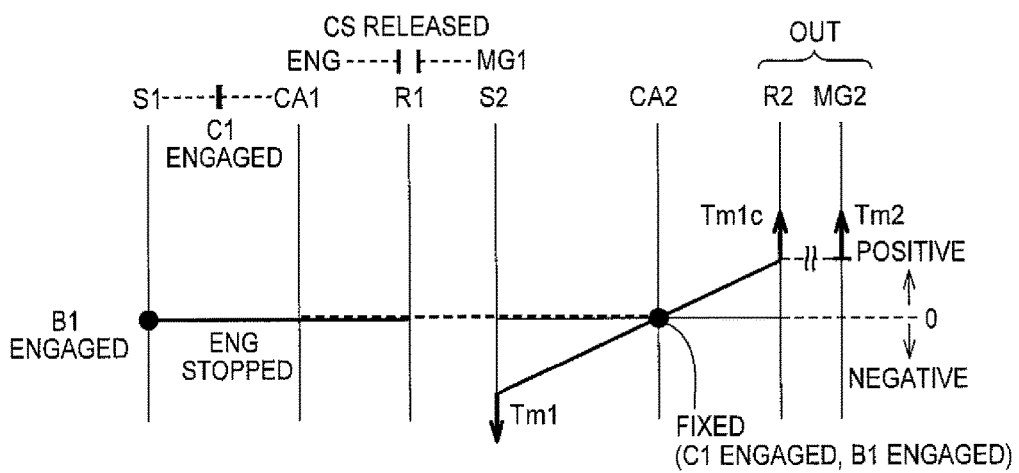
FIG. 6 is a nomograph in two-motor EV mode.

The controller 100 causes the first MG 20 and the second MG 30 to mainly operate as motors (see FIG. 6 (described later)).

E4 and E5 lines in EV mode will be described. These modes as well as E3 line are two-motor modes, and differ from E3 line in that these modes are operable even when the engine rotation speed Ne is not zero (Ne free in FIG. 4).

In HV mode, the drive mode is further divided into three modes, that is, a series-parallel mode, a series mode and a parallel mode. In series-parallel mode or series mode, the controller 100 causes the first MG 20 to operate as a generator, and causes the second MG 30 to operate as a motor. In parallel mode, the controller 100 causes only the second MG 30 to operate as a motor (one-motor mode) or causes both the first MG 20 and the second MG 30 to operate as motors (two-motor mode).

In HV mode, the controller 100 changes the drive mode among the series-parallel mode, the series mode and the parallel mode.

In series-parallel mode, part of the power of the engine 10 is used in order to drive the drive wheels 90, and the remaining part of the power of the engine 10 is used as power for generating electric power with the first MG 20 (that is, the remaining part of the engine power is used to rotate the first MG 20 so that the first MG 20 generates electric power). The second MG 30 drives the drive wheels 90 by using electric power generated by the first MG 20. In series-parallel mode, the controller 100 changes the speed ratio of the transmission unit 40 in response to the vehicle speed.

Figure 10:
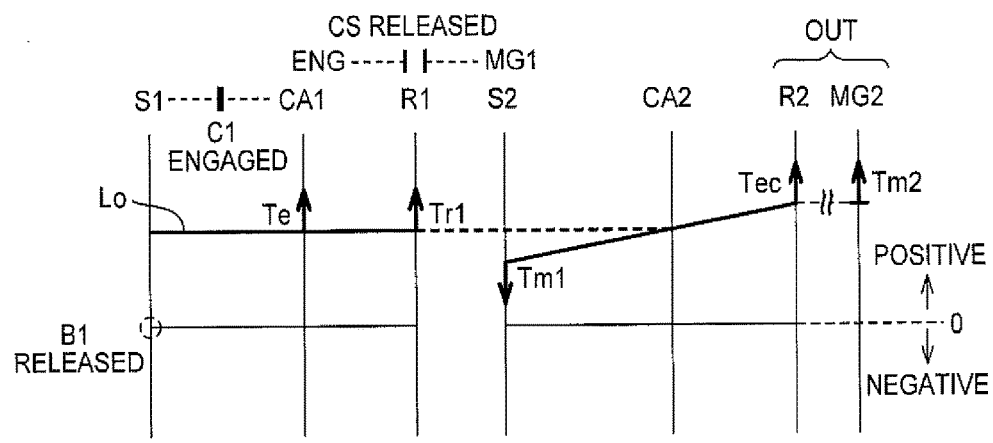
FIG. 10 is a nomograph in series-parallel low-gear HV mode.

When the vehicle 1 is caused to move forward in an intermediate or low speed range, the controller 100 establishes the low gear stage Lo (see FIG. 10 (described later)) by engaging the clutch C1 and releasing the brake B1 as shown in the H2 line in FIG. 4. On the other hand, when the vehicle 1 is caused to move forward in a high speed range, the controller 100 establishes the high gear stage Hi (see FIG. 11 (described later)) by releasing the clutch C1 and engaging the brake B1 as shown in the H1 line in FIG. 4. Either when the high gear stage is established or when the low gear stage is established, the transmission unit 40 and the differential unit 50 operate as a continuously variable transmission as a whole.

When the vehicle 1 is reversed, the controller 100 engages the clutch C1 and releases the brake B1 as shown in the H3 line in FIG. 4. When there is an allowance in the SOC of the battery (when the battery has enough charge), the controller 100 rotates the second MG 30 alone in the reverse direction; whereas, when there is no allowance in the SOC of the battery (when the battery has insufficient charge), the controller 100 generates electric power with the use of the first MG 20 by operating the engine 10 and rotates the second MG 30 in the reverse direction.

In series mode, the entire power of the engine 10 is used as power for generating electric power with the use of the first MG 20. The second MG 30 drives the drive wheels 90 by using electric power generated by the first MG 20. In series mode, when the vehicle 1 is moved forward or when the vehicle 1 is reversed, the controller 100 releases both the clutch C1 and the brake B1 and engages the clutch CS (see FIG. 7 (described later)) as shown in the H4 line and the H5 line in FIG. 4.

The controlled statuses in parallel HV mode are shown in H6 to 119 lines. These are also the HV mode; however, the first MG 20 does not operate as a generator. The two-motor parallel HV mode significantly differs from the series-parallel mode or the series mode in that the first MG 20 operates to carry out motoring as a motor and outputs torque for rotating the drive wheels. In parallel mode, any one of the clutch C1 and the brake B1 is engaged, the other one of the clutch C1 and the brake B1 is released, and the clutch CS is engaged. The details of these modes will be described later with reference to the nomographs of FIG. 8 and FIG. 9.

The vehicle 1 is able to travel in engine drive mode in which the vehicle 1 travels without using the first MG 20 or the second MG 30. When the traveling state of the vehicle coincides with a rotation speed and a torque at which the efficiency of the engine is high, the efficiency is higher when the power of the engine is directly used to rotate the drive wheels than when the power of the engine is used to generate electric power, or the like.

Hereinafter, the statuses of the rotating elements in typical control modes among the control modes shown in FIG. 4 will be described with reference to the nomographs.

Figure 5:
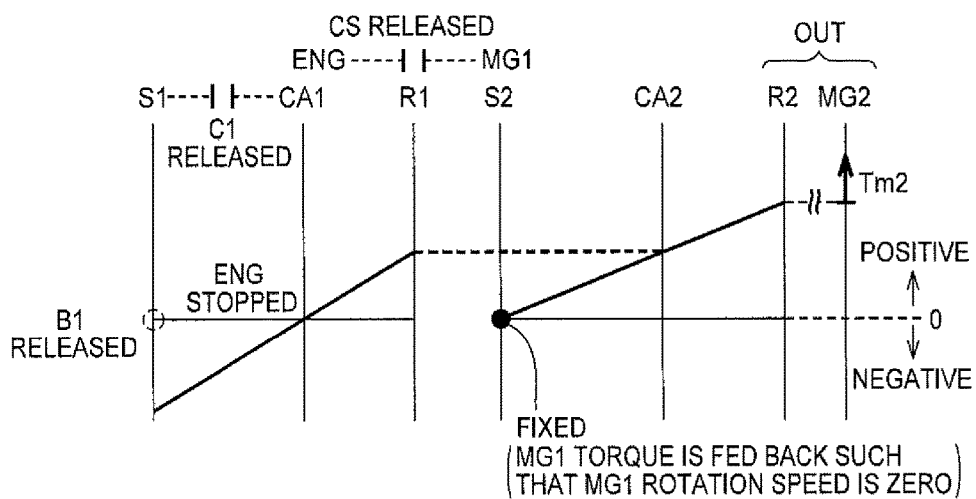
FIG. 5 is a nomograph in one-motor EV mode.
Figure 7:
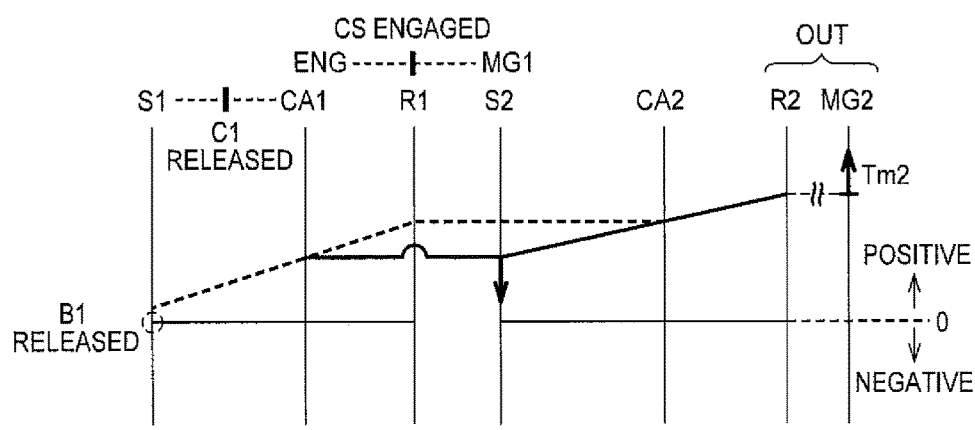
FIG. 7 is a nomograph in series HV mode.
Figure 8:
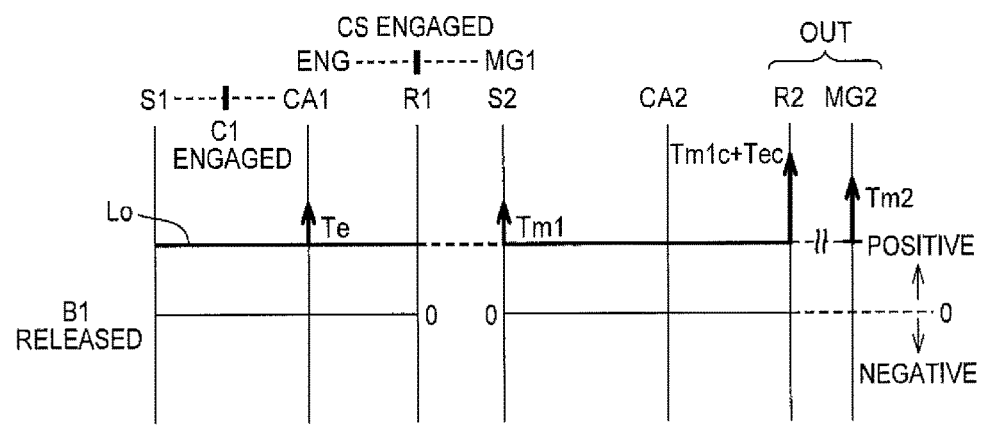
FIG. 8 is a nomograph in parallel low-gear HV mode.
Figure 9:
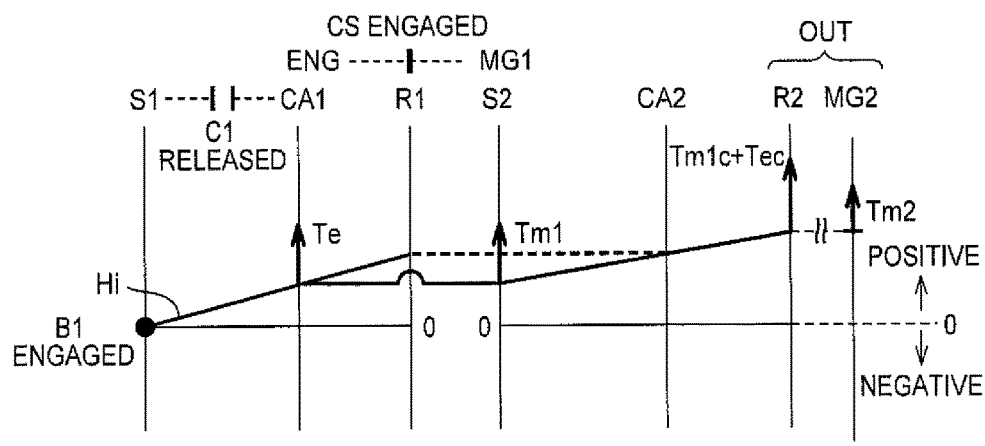
FIG. 9 is a nomograph in parallel high-gear HV mode.
Figure 11:
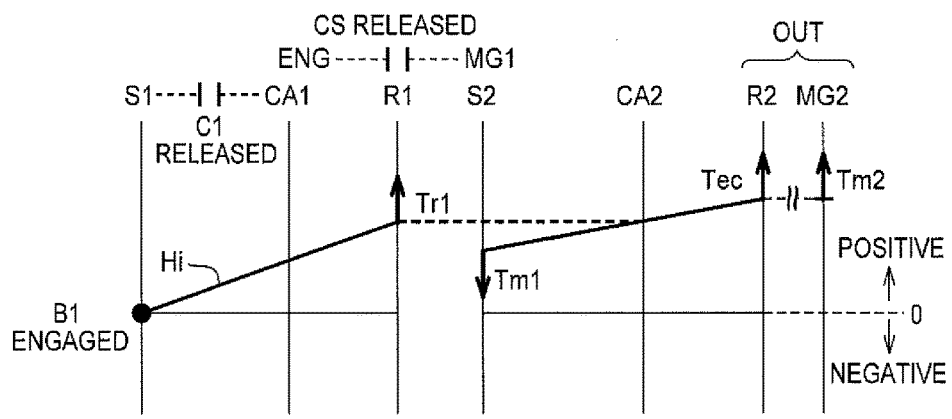
FIG. 11 is a nomograph in series-parallel high-gear HV mode.

FIG. 5 is a nomograph in one-motor EV mode. FIG. 6 is a nomograph in two-motor EV mode. FIG. 7 is a nomograph in series HV mode. FIG. 8 is a nomograph in parallel low-gear HV mode. FIG. 9 is a nomograph in parallel high-gear HV mode, FIG. 10 is a nomograph in series-parallel low-gear HV mode. FIG. 11 is a nomograph in series-parallel high-gear HV mode.

The parallel low-gear mode is a control mode in which the drive mode is the parallel mode and the speed stage of the transmission unit 40 is the low gear stage Lo. The parallel high-gear mode is a control mode in which the drive mode is the parallel mode and the speed stage of the transmission unit 40 is the high gear stage Hi. The series-parallel low-gear mode is a control mode in which the drive mode is the series-parallel mode and the speed stage of the transmission unit 40 is the low gear stage Lo. The series-parallel high-gear mode is a control mode in which the drive mode is the series-parallel mode and the speed stage of the transmission unit 40 is the high gear stage Hi.

In FIG. 5 to FIG. 11, S1, CA1 and R1 respectively denote the sun gear S1, the carrier CA1 and the ring gear R1 of the transmission unit 40, S2, CA2 and R2 respectively denote the sun gear S2, the carrier CA2 and the ring gear R2 of the differential unit 50.

The controlled statuses in one-motor EV mode (E1 line in FIG. 4) will be described with reference to FIG. 5. In one-motor EV mode, the controller 100 releases the clutch C1 and the brake B1 of the transmission unit 40 and the clutch CS, stops the engine 10, and causes the second MG 30 to mainly operate as a motor. Therefore, in one-motor EV mode, the vehicle 1 travels by using the MG2 torque Tm2.

At this time, the controller 100 executes feedback control over the MG1 torque Tm1 such that the rotation speed of the sun gear S2 becomes zero. Therefore, the sun gear S2 does not rotate. However, because the clutch C1 and brake B1 of the transmission unit 40 are released, the rotation of the carrier CA2 of the differential unit 50 is not restricted. Therefore, the ring gear R2 and carrier CA2 of the differential unit 50 and the ring gear R1 of the transmission unit 40 are rotated (coasted) interlocking with the rotation of the second MG 30 in the same direction as the second MG 30.

On the other hand, the carrier CA1 of the transmission unit 40 is kept in a stopped state because the engine 10 is stopped. The sun gear S1 of the transmission unit 40 is rotated (coasted) interlocking with the rotation of the ring gear R1 in a direction opposite to the rotation direction of the ring gear R1.

In order to decelerate the vehicle in one-motor EV mode, it is allowed to activate engine brake in addition to regenerative brake using the second MG 30. In this case (E2 line in FIG. 4), by engaging any one of the clutch C1 and the brake B1, the engine 10 is also rotated at the time when the carrier CA2 is driven from the drive wheels 90 side, so engine brake is activated.

Next, the controlled statuses in two-motor EV mode (E3 line in FIG. 4) will be described with reference to FIG. 6. In two-motor EV mode, the controller 100 engages the clutch C1 and the brake B1, releases the clutch CS, and stops the engine 10. Therefore, the rotation of each of the sun gear S1, carrier CA1 and ring gear R1 of the transmission unit 40 is restricted such that the rotation speed becomes zero.

Because the rotation of the ring gear R1 of the transmission unit 40 is restricted, the rotation of the carrier CA2 of the differential unit 50 is also restricted (locked). In this state, the controller 100 causes the first MG 20 and the second MG 30 to mainly operate as motors. Specifically, the second MG 30 is rotated in the positive direction by setting the MG2 torque Tm2 to a positive torque, and the first MG 20 is rotated in the negative direction by setting the MG1 torque Tm1 to a negative torque.

When the rotation of the carrier CA2 is restricted by engaging the clutch C1, the MG1 torque Tm1 is transmitted to the ring gear R2 by using the carrier CA2 as a supporting point. The MG1 torque Tm1 (hereinafter, referred to as MG1 transmission torque Tm1c) that is transmitted to the ring gear R2 acts in the positive direction, and is transmitted to the counter shaft 70. Therefore, in two-motor EV mode, the vehicle 1 travels by using the MG1 transmission torque Tm1c and the MG2 torque Tm2. The controller 100 adjusts the distribution ratio between the MG1 torque Tm1 and the MG2 torque Tm2 such that the sum of the MG1 transmission torque Tm1c and the MG2 torque Tm2 meets the user's required torque.

The controlled statuses in series HV mode (H4 line in FIG. 4) will be described with reference to FIG. 7. In series HV mode, the controller 100 releases the clutch C1 and the brake B1, and engages the clutch CS. Therefore, when the clutch CS is engaged, the sun gear S2 of the differential unit 50 rotates at the same rotation speed as the carrier CA1 of the transmission unit 40, and the rotation of the engine 10 is transmitted from the clutch CS to the first MG 20 at the same rotation speed. Thus, electric power is allowed to be generated with the use of the first MG 20 by using the engine 10 as a power source.

On the other hand, because both the clutch C1 and the brake B1 are released, the rotation of each of the sun gear S1 and ring gear R1 of the transmission unit 40 and the rotation of the carrier CA2 of the differential unit 50 are not restricted. That is, because the transmission unit 40 is in the neutral state and the rotation of the carrier CA2 of the differential unit 50 is not restricted, the power of the first MG 20 and the power of the engine 10 are not transmitted to the counter shaft 70. Therefore, the MG2 torque Tm2 is transmitted to the counter shaft 70. Accordingly, in series HV mode, while electric power is generated with the use of the first MG 20 by using the engine 10 as a power source, the vehicle 1 travels by using the MG2 torque Tm2 generated by the use of part or all of the generated electric power.

Because the series mode is allowed to be achieved, it is possible to select the operating point of the engine 10 without concern for occurrence of tooth contact noise of the gear mechanism due to engine torque fluctuations, to which attention needs to be paid in series-parallel mode, when the vehicle travels at a low vehicle speed or when the vehicle is in a vehicle state where background noise is low. Thus, a vehicle state that enables both quietness of the vehicle and improvement in fuel consumption increases.

The controlled statuses in parallel low-gear HV mode (H8 and H9 lines in FIG. 4) will be described with reference to FIG. 8.

In parallel low-gear mode, the controller 100 engages the clutch C1 and the clutch CS and releases the brake B1. Therefore, the rotating elements (the sun gear S1, the carrier CA1 and the ring gear R1) of the differential unit 50 rotate integrally with one another. Thus, the ring gear R1 of the transmission unit 40 also rotates at the same rotation speed as the carrier CA1. Because the clutch CS is engaged, the sun gear S2 of the differential unit 50 rotates at the same rotation speed as the carrier CA1 of the transmission unit 40, and the rotation of the engine 10 is transmitted from the clutch CS to the first MG 20 at the same rotation speed. Thus, all the rotating elements of the differential unit 50 and rotating elements (the sun gear S2, the carrier CA2 and the ring gear R2) of the transmission unit 40 rotate at the same rotation speed. That is, the difference (speed ratio) between the rotation speed of the engine 10 and the rotation speed of the ring gear R2 is fixed to a first speed ratio.

The controlled statuses in parallel high-gear HV mode (H6 and H7 lines in FIG. 4) will be described with reference to FIG. 9.

In parallel high-gear mode, the controller 100 engages the brake B1 and the clutch CS and releases the clutch C1. Because the brake B1 is engaged, the rotation of the sun gear S1 is restricted. Thus, the rotation of the engine 10, input to the carrier CA1 of the transmission unit 40, is increased in speed, and is transmitted from the ring gear R1 of the transmission unit 40 to the carrier CA2 of the differential unit 50. Because the clutch CS is engaged, the sun gear S2 of the differential unit 50 rotates at the same rotation speed as the carrier CA1 of the transmission unit 40, and the rotation of the engine 10 is transmitted from the clutch CS to the first MG 20 at the same rotation speed. Thus, the rotation speed of the carrier CA2 and the rotation speed of the sun gear S2 are restricted by the use of the engine rotation speed, so the difference (speed ratio) between the rotation speed of the engine 10 and the rotation speed of the ring gear R2 is fixed to a second speed ratio. The second speed ratio is a value on a speed increasing side with respect to the first speed ratio (value smaller than the first speed ratio).

In two-motor parallel stepped HV mode (H7, 119 lines in FIG. 4), the torque Te of the engine 10 (hereinafter, referred to as engine torque Te), the MG 1 torque Tm1 and the MG2 torque Tm2 all are allowed to be used for the forward rotation torque of the drive wheels, so it is particularly effective when a large torque is required of the drive wheels. The controlled statuses in one-motor parallel: stepped HV mode (H6, H8 lines in FIG. 4) correspond to the case where Tm1=0 in FIG. 8 and FIG. 9. In parallel stepped HV mode, the vehicle 1 is allowed to travel by setting Tm1=0 and Tm2=0 and using only the engine torque.

The controlled statuses in series-parallel low-gear HV mode (H2 line in FIG. 4) will be described with reference to FIG. 10.

In series-parallel low-gear mode, the controller 100 engages the clutch C1 and releases the brake B1 and the clutch CS. Therefore, the rotating elements (the sun gear S1, the carrier CA1 and the ring gear R1) rotate integrally with one another. Thus, the ring gear R1 of the transmission unit 40 also rotates at the same rotation speed as the carrier CA1, and the rotation of the engine 10 is transmitted from the ring gear R1 to the carrier CA2 of the differential unit 50 at the same rotation speed. That is, the engine torque Te input to the carrier CA1 of the transmission unit 40 is transmitted from the ring gear R1 of the transmission unit 40 to the carrier CA2 of the differential unit 50. When the low gear stage Lo is established, the torque that is transmitted from the ring gear R1 (hereinafter, referred to as transmission unit output torque Tr1) is equal to the engine torque Te (Te=Tr1).

The rotation of the engine 10, transmitted to the carrier CA2 of the differential unit 50, is steplessly shifted by the use of the rotation speed of the sun gear S2 (the rotation speed of the first MG 20), and is transmitted to the ring gear R2 of the differential unit 50. At this time, the controller 100 basically causes the first MG 20 to operate as a generator to apply the MG1 torque Tm1 in the negative direction. Thus, the MG1 torque Tm1 serves as reaction force for transmitting the engine torque Te, input to the carrier CA2, to the ring gear R2.

The engine torque Te transmitted to the ring gear R2 (hereinafter, referred to as engine transmission torque Tec) is transmitted from the counter drive gear 51 to the counter shaft 70, and acts as driving force of the vehicle 1.

In series-parallel low-gear HV mode, the controller 100 causes the second MG 30 to mainly operate as a motor. The MG2 torque Tm2 is transmitted from the reduction gear 32 to the counter shaft 70, and acts as driving force of the vehicle 1. That is, in series-parallel low-gear HV mode, the vehicle 1 travels by using the engine transmission torque Tec and the MG2 torque Tm2.

The controlled statuses in series-parallel high-gear HV mode (H1 line in FIG. 4) will be described with reference to FIG. 11.

In series-parallel high-gear mode, the controller 100 engages the brake B1 and releases the clutch C1 and the clutch CS. Because the brake B1 is engaged, the rotation of the sun gear S1 is restricted. Thus, the rotation of the engine 10, input to the carrier CA1 of the transmission unit 40, is increased in speed, and is transmitted from the ring gear R1 of the transmission unit 40 to the carrier CA2 of the differential unit 50. Therefore, when the high gear stage Hi is established, the transmission unit output torque Tr1 is smaller than the engine torque Te (Te>Tr1).

Usage Situation of Each Control Mode

Figure 12:
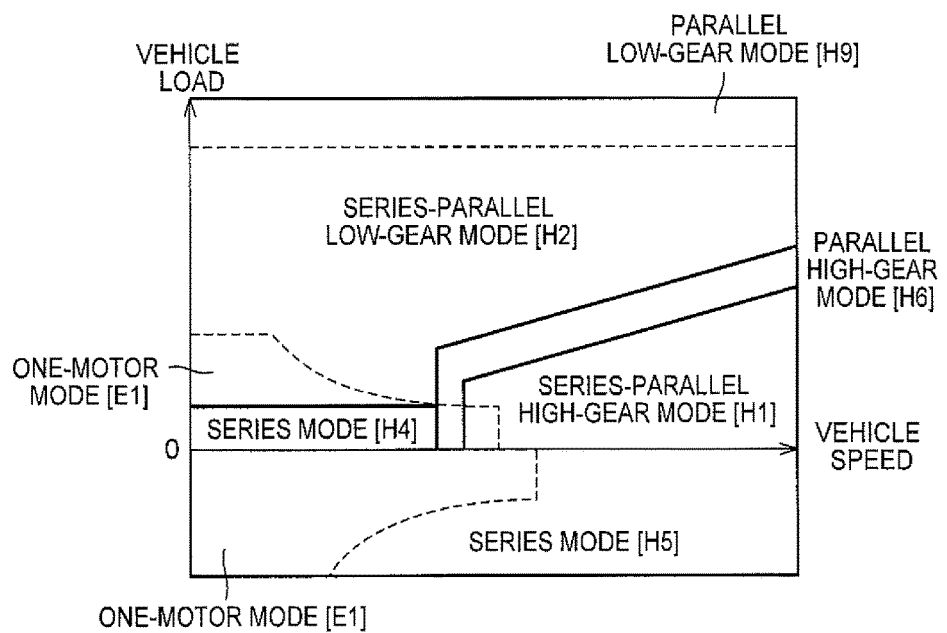
FIG. 12 is a first mode determination map that determines a control mode.

FIG. 12 is a mode determination map that determines the control mode in the case where the vehicle 1 travels by mainly using fuel as an energy source. This mode determination map is used when a hybrid vehicle travels in normal times or a plug-in hybrid vehicle travels in CS mode in which the state of charge of a battery is sustained. FIG. 12 overlappingly shows a map of which boundary lines are indicated by dashed lines and a map of which boundary lines are indicated by continuous lines. The map of which the boundary lines are indicated by dashed lines is a map that is used in normal times when the input/output power of the battery 60 is not limited. On the other hand, the map of which the boundary lines are indicated by continuous lines is a map that is used when the input/output power of the battery 60 is limited depending on various conditions, such as SOC and temperature.

Initially, a region in which a vehicle load is positive in the map of which the boundary lines are indicated by dashed lines will be described. In a region in which the vehicle speed is close to zero and the vehicle load is small, the one-motor EV mode is used. The reason why the one-motor mode but not the two-motor mode is used is to allow an engine startup immediately at the time when an accelerator pedal is suddenly depressed. When the vehicle speed becomes higher or the vehicle load increases, the series-parallel low-gear mode is used. When the vehicle load further increases and torque is insufficient in series-parallel low-gear mode, all the engine torque Te is output to the drive wheels and motor assist that also uses the MG1 torque Tm1 or the MG2 torque Tm2 is performed in parallel low-gear mode. This mode may be used at the time of a power-on downshift.

Subsequently, a region in which the vehicle load is negative in the map of which the boundary lines are indicated by dashed lines will be described. In a region in which the vehicle speed is close to zero and the vehicle load is small, the one-motor EV mode is used. When the vehicle speed increases, the series mode is used. The reason why the region of the one-motor EV mode is wider when the vehicle load is negative than when the vehicle load is positive is that, because the engine 10 is started in series mode, it is not necessary to provide a margin for the amount of reaction torque for reducing a shock at an engine startup.

Next, a region in which the vehicle load is positive in the map of which the boundary lines are indicated by continuous lines will be described. When the vehicle load is positive and the vehicle speed is low, the series mode is used. The series mode is effective to prevent noise (so-called rattle) due to rattling between the second MG 30 and the differential gear.

With an increase in the vehicle speed, the control mode changes from the series mode to the parallel high-gear mode and then to the series-parallel high-gear mode. Because the parallel high-gear mode is a fixed gear ratio, the engine 10 tends to deviate from the operating point that minimizes fuel consumption, so a service region has a relatively narrow band shape.

When the vehicle load increases, the control mode changes from the series mode to the series-parallel low-gear mode. The series-parallel low-gear mode is effective in a region in which driving force is given a higher priority.

Next, the region in which the vehicle load is negative in the map of which the boundary lines are indicated by continuous lines will be described. When the vehicle load is negative, the series mode is used irrespective of the vehicle speed. In series mode, the engine rotation speed is arbitrarily controllable at the same vehicle speed, so it is possible to generate engine brake torque commensurate with a driver's request. Because the first MG 20 is rotated against the engine brake torque, the first MG 20 performs motoring operation. Therefore, regenerated electric power generated by regenerative brake in the second MG 30 is allowed to be consumed by the first MG 20, so, even when the battery 60 cannot receive regenerated electric power, it is possible to perform regenerative brake with the use of the second MG 30. In addition, because the rotation speed of the first MG 20 is equal to the engine rotation speed, the series mode is insusceptible to constraints of the engine rotation speed due to the upper limit of the rotation speed of the first MG 20 as compared to the other modes, so it is possible to increase the absolute value of the engine brake torque.

Figure 13:
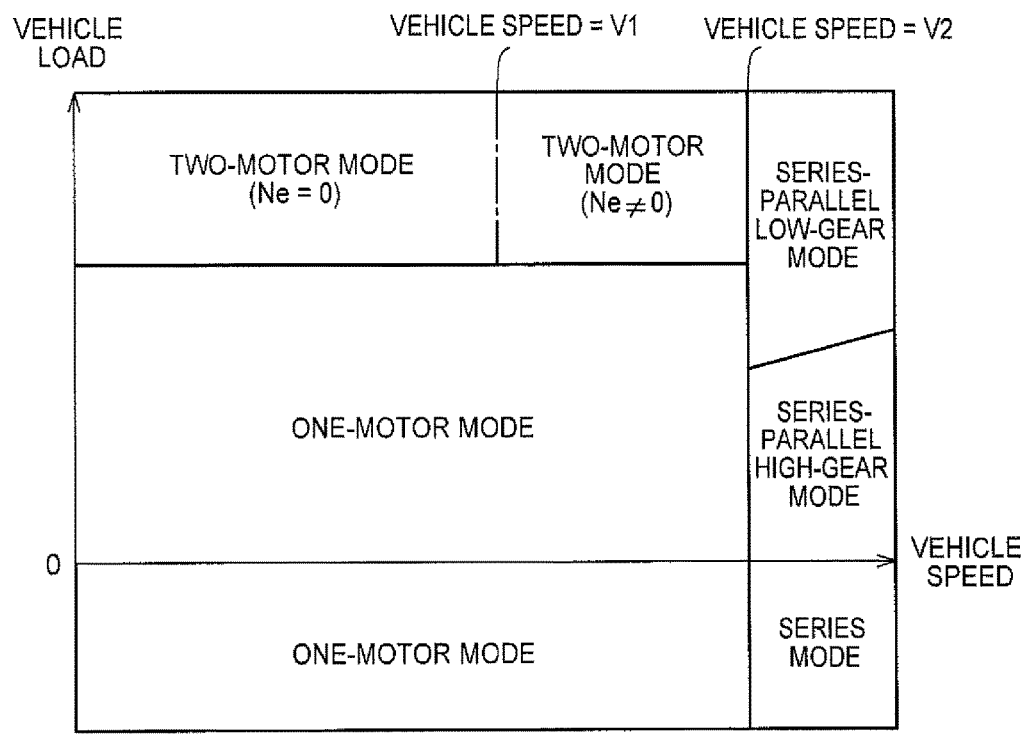
FIG. 13 is a second mode determination map that determines a control mode.

FIG. 13 is a mode determination map that determines the control mode in the case where the vehicle 1 travels by mainly using electric power, charged in the battery 60, as an energy source. This mode determination map is used when a hybrid vehicle travels in EV mode or a plug-in hybrid vehicle travels in CD mode in which the state of charge of a battery is consumed.

As shown in FIG. 13, in a positive and negative low load region, the one-motor EV mode is used. In CD mode, it is basically not necessary to assume a startup of the engine 10, so reaction compensation torque resulting from a startup of the engine 10 is not required, and a relatively wide region is allowed to be allocated to the one-motor EV mode.

In a high load region, torque becomes insufficient in one-motor mode, so the two-motor mode is selected. That is, in the case where the vehicle speed is lower than a predetermined value and in a region in which the load is small, the one-motor EV mode is selected; whereas, when the load is larger than a predetermined value, the two-motor EV mode is selected.

When the vehicle speed exceeds a predetermined value V1 in two-motor mode, because there is an upper limit of the rotation speed of each of the first MG 20 and pinion gears, the state of the vehicle changes from the two-motor mode in which the engine rotation speed Ne is zero to the two-motor mode in which the engine rotation speed Ne is not zero.

When the vehicle speed exceeds V2, energy efficiency at the time when the vehicle 1 travels by using the electric power of the battery tends to deteriorate, so any one of the series-parallel low-gear HV mode, the series-parallel high-gear HV mode and the series HV mode is selected. In FIG. 13, in a region in which the vehicle speed is higher than V2, the series mode is selected when the vehicle load is negative; whereas, when the vehicle load is positive, the series-parallel high-gear mode is selected at a low load, and the series-parallel low-gear mode is selected at a high load.

Change of Control Mode (Drive Mode and Speed Stage)

In the case where the control mode of the thus configured vehicle 1 is the HV mode, when the change of the drive mode between the series-parallel mode and the parallel mode and the change of the speed stage of the transmission unit 40 between the high gear stage Hi and the low gear stage Lo are performed at the same time, the number of objects to be controlled at the same time increases, so there is a concern that control becomes complex.

FIG. 14 is a view that shows changes in controlled objects resulting from a change in the control mode in HV mode. As described above, the control modes in HV mode include the series mode, the series-parallel low-gear mode, the series-parallel high-gear mode, the parallel low-gear mode and the parallel high-gear mode.

FIG. 14 shows not only changes in controlled objects (the clutch C1, the brake B1, the clutch CS and the MG1 torque Tm1) resulting from a change in the control mode but also the number of controlled objects to be changed and whether synchronization before changing the control mode is allowed. The control mode before the change includes (A) series mode, (B) series-parallel low-gear mode, (C) series-parallel high-gear mode, (D) parallel low-gear mode and (E) parallel high-gear mode. The control mode after the change also similarly includes (a) series mode, (b) series-parallel low-gear mode, (c) series-parallel high-gear mode, (d) parallel low-gear mode and (e) parallel high-gear mode.

In FIG. 14, C1 shows whether there is a change in the engagement state of the clutch C1, B1 shows whether there is a change in the engagement state of the brake B1 and CS shows whether there is a change in the engagement state of the clutch CS. Specifically, the circle mark (○) in each field indicates the engaged state, and the cross mark (x) indicates the released state. That is, "○→x" in FIG. 14 indicates a change from the engaged state to the released state. "x→○" in FIG. 14 indicates a change from the released state to the engaged state. "○" in FIG. 14 indicates that the engaged state is kept. "x" in FIG. 14 indicates that the released state is kept.

Tm1 in FIG. 14 shows whether there is a change in the MG1 torque Tm1. Specifically, the circle mark (○) indicates that there is a torque output (not zero), the cross mark "x" indicates that the torque output is zero. That is, "○→x" in FIG. 14 indicates a change from a state where the MG1 torque Tm1 is not zero to a state where the MG1 torque Tm1 is zero. "x→○" in FIG. 14 indicates a change from the state where the MG1 torque Tm1 is zero to the state where the MG1 torque Tm1 is not zero. "○→○" in FIG. 14 each indicates that the torque changes although the MG1 torque Tm1 remains not zero. "x" in FIG. 14 indicates that the state where the MG1 torque Tm1 is zero is kept.

"sum" in FIG. 14 shows the number of controlled objects to be changed. "○→○" in Tm1 line of FIG. 14 is included in the number of controlled objects to be changed because torque changes although the MG1 torque Tm1 remains in a non-zero state.

"SYNCHRONIZATION" in FIG. 14 shows that the rotation speeds of the rotating elements of the power transmission system, including the transmission unit 40 and the differential unit 50, before changing the control mode are synchronized in advance with the rotation speeds after changing the control mode such that the rotation speeds of the rotating elements of the power transmission system do not rapidly change as a result of changes in the states of the engagement elements (the clutch C1, the brake B1 and the clutch CS) resulting from a change in the control mode. "ALLOWED" in FIG. 14 indicates that synchronization before a change in the control mode is allowed. "NOT ALLOWED" in FIG. 14 indicates that synchronization before a change in the control mode is not allowed.

For example, when the control mode is changed from the series-parallel low-gear mode to the parallel high-gear mode (in the case of a combination of (B) and (e) in FIG. 14), because C1 in FIG. 14 is "○→x", the clutch C1 changes from the engaged state to the released state. Because "B1" in FIG. 14 is "x→○", the brake B1 changes from the released state to the engaged state. Because CS in FIG. 14 is "x→○", the clutch CS changes from the released state to the engaged state. Because Tm1 in FIG. 14 is "○→x", the MG1 torque Tm1 changes from a non-zero state to a zero state. Therefore, the number of controlled objects to be changed is four, that is, C1, B1, CS and Tm1, so "4" is shown in "sum" in FIG. 14. "SYNCHRONIZATION" in FIG. 14 shows "NOT ALLOWED". That is, in series-parallel low-gear mode before the change, it is not allowed to synchronize the speed ratio of the power transmission system (rotation speed ratio between the rotation speed of the carrier CA1 of the transmission unit 40 and the rotation speed of the ring gear R2 of the differential unit 50) with the speed ratio of the power transmission system in parallel high-gear mode after the change in advance. This is because the speed ratio of the power transmission system in parallel high-gear mode after the change does not fall within the changeable range of the speed ratio of the power transmission system in series-parallel low-gear mode before the change (see FIG. 15 and FIG. 16 (described later)).

A change resulting from another change is also as shown in FIG. 14, so the detailed description thereof will not be repeated.

Among combinations in changing the control mode, shown in FIG. 14, in changes indicated by dashed-line boxes in FIG. 14, that is, a change between the series-parallel low-gear mode and the parallel high-gear mode (a change between (B) and (e) and a change between (E) and (b) in FIG. 14) and a change between the series-parallel high-gear mode and the parallel low-gear mode (a change between (D) and (c) and a change between (C) and (d) in FIG. 14), the number of controlled objects to be changed is larger than the other changes and is four, and "SYNCHRONIZATION" is not allowed. This is because it is required to not only change the drive mode between the series-parallel mode and the parallel mode but also change the speed stage between the low speed stage (the clutch C1 is engaged and the brake B1 is released) and the high speed stage (the brake B1 is engaged and the clutch C1 is released) in the transmission unit 40.

In this way, in a change between the series-parallel low-gear mode and the parallel high-gear mode and a change between the series-parallel high-gear mode and the parallel low-gear mode, not only synchronization before a change in the control mode is not allowed but also both a change in the drive mode and a change in the speed stage are performed, so there are many objects to be controlled at the same time, and there is a concern that control becomes complex.

In consideration of such an inconvenience, when a change between the series-parallel low-gear mode and the parallel high-gear mode is required or when a change between the series-parallel high-gear mode and the parallel low-gear mode is required (that is, when both a change in the drive mode and a change in the speed stage are required), the controller 100 according to the present embodiment selectively executes any one of first change control and second change control. In the first change control, the drive mode and the speed stage are changed by passing through the series mode. In the second change control, without passing through the series mode, a change in one of the drive mode and the speed stage is performed and then a change in the other one of the drive mode and the speed stage is performed.

In the first change control, because the drive mode and the speed stage are changed by passing through the series mode, the number of objects that are controlled at the same time reduces and control is simplified as compared to the case where the drive mode and the speed stage are changed at the same time (in the case where the control mode is directly changed from the series-parallel low-gear mode to the parallel high-gear mode).

FIG. 15 shows a change in the speed ratio of the power transmission system in the case where a change between the series-parallel low-gear mode and the parallel high-gear mode is performed by the use of the first change control. The speed ratio of the power transmission system is the rotation speed ratio between the rotation speed of the carrier CA1 of the transmission unit 40 and the rotation speed of the ring gear R2 of the differential unit 50 as described above. In FIG. 15, the abscissa axis represents the speed ratio of the power transmission system.

In FIG. 15, the rectangular region (A) indicates the changeable range of the speed ratio of the power transmission system in series-parallel low-gear mode, the rectangular region (B) indicates the changeable range of the speed ratio of the power transmission system in series mode, and the rectangular region (C) indicates the changeable range of the speed ratio of the power transmission system in series-parallel high-gear mode.

In FIG. 15, the rectangular region (D) indicates the first speed ratio (hereinafter, also referred to as low-gear synchronization rotation speed ratio) of the power transmission system in parallel low-gear mode, and the rectangular region (E) indicates the second speed ratio (hereinafter, also referred to as high-gear synchronization rotation speed ratio) of the power transmission system in parallel high-gear mode. Each of the first speed ratio (low-gear synchronization rotation speed ratio) and the second speed ratio (high-gear synchronization rotation speed ratio) is a fixed value, and is prestored in an internal memory of the controller 100.

As shown in FIG. 15, the changeable range of the speed ratio of the power transmission system in series-parallel low-gear mode includes the first speed ratio (low-gear synchronization rotation speed ratio) of the power transmission system in parallel low-gear mode, but does not include the second speed ratio (high-gear synchronization rotation speed ratio) of the power transmission system in parallel high-gear mode. Similarly, the changeable range of the speed ratio of the power transmission system in series-parallel high-gear mode includes the second speed ratio (high-gear synchronization rotation speed ratio) of the power transmission system in parallel high-gear mode, but does not include the first speed ratio (low-gear synchronization rotation speed ratio) of the power transmission system in parallel low-gear mode. On the other hand, the changeable range of the speed ratio in series mode includes both the first speed ratio (low-gear synchronization rotation speed ratio) of the power transmission system in parallel low-gear mode and the second speed ratio (high-gear synchronization rotation speed ratio) of the power transmission system in parallel high-gear mode.

For example, it is assumed that the current control mode is the series-parallel low-gear mode and the current speed ratio of the power transmission system is A(0) that is on a speed reduction side with respect to the low-gear synchronization rotation speed ratio. When a request to change the control mode to the parallel high-gear mode has been issued in this case, the controller 100 changes the control mode from the series-parallel low-gear mode to the parallel high-gear mode by the use of the first change control.

In the first change control, the speed ratio of the power transmission system changes along the path indicated by the continuous arrow in FIG. 15. Specifically, the controller 100 sequentially executes the following process.

Initially, the controller 100 synchronizes the speed ratio of the power transmission system with the low-gear synchronization rotation speed ratio. This process is implemented by executing feedback control over the MG1 torque Tm1 such that the rotation speed of the first MG 20 is synchronous with the rotation speed of the engine 10.

After the speed ratio of the power transmission system is synchronized with the low-gear synchronization rotation speed ratio, the controller 100 changes the drive mode to the series mode. The number of objects that are controlled at the same time in this change is three, that is, C1, Cs and Tm1, as shown in the combination of (B) and (a) in FIG. 14, and is smaller than four.

After the drive mode is changed to the series mode, the controller 100 synchronizes the speed ratio of the power transmission system with the high-gear synchronization rotation speed ratio. This process is implemented by executing feedback control over the MG1 torque Tm1 such that the rotation speed of the sun gear S1 of the transmission unit 40 is zero.

After the speed ratio of the power transmission system is synchronized with the high-gear synchronization rotation speed ratio, the controller 100 changes the drive mode to the parallel mode and changes the speed stage of the transmission unit 40 to the high gear stage Hi. The number of objects that are controlled at the same time in this change is two, that is, B1 and Tm1, as shown in the combination of (A) and (e) in FIG. 14, and is smaller than four.

In this way, when the control mode is changed from the series-parallel low-gear mode to the parallel high-gear mode by the use of the first change control, the number of objects that are controlled at the same time is smaller than four that is the number of objects that are controlled at the same time in the case where the control mode is directly changed from the series-parallel low-gear mode to the parallel high-gear mode, so control is simplified.

When the control mode is changed from (C) series-parallel high-gear mode to (d) parallel low-gear mode, from (D) parallel low-gear mode to (c) series-parallel high-gear mode or from (E) parallel high-gear mode to (b) series-parallel low-gear mode by the use of the first change control as well, the number of objects that are controlled at the same time is smaller than four, so control is simplified.

The first change control includes the process of synchronizing the speed ratio of the power transmission system with the low-gear synchronization rotation speed ratio (hereinafter, referred to as first synchronization control) and the process of synchronizing the speed ratio of the power transmission system with the high-gear synchronization rotation speed ratio (hereinafter, referred to as second synchronization control). Therefore, it is possible to suppress occurrence of a shock due to a change in both the drive mode and the speed stage. Therefore, it is possible to smoothly change the drive mode and the speed stage.

In the example shown in FIG. 15, because the current speed ratio A(0) of the power transmission system is on a speed reduction side with respect to the low-gear synchronization rotation speed ratio, so the direction in which the speed ratio of the power transmission system changes through the first synchronization control and the direction in which the speed ratio of the power transmission system changes through the second synchronization control are both in a speed increasing direction.

However, when the current speed ratio A(0) of the power transmission system falls between the low-gear synchronization rotation speed ratio and the high-gear synchronization rotation speed ratio, the direction in which the speed ratio of the power transmission system changes through the first synchronization control and the direction in which the speed ratio of the power transmission system changes through the second synchronization control are opposite directions. That is, because the speed ratio of the power transmission system not only changes in the speed reduction direction but also changes in the speed increasing direction during the first change control, there is a concern that the rotation speed of the engine 10 increases or decreases and, as a result, a user experiences a feeling of strangeness.

When it is predicted that the speed ratio of the power transmission system changes in both the speed reduction direction and the speed increasing direction if the controller 100 executes the first change control, that is, when an actual value of the speed ratio of the power transmission system before the change (or a target value of the speed ratio after the change) falls between the low-gear synchronization rotation speed ratio and the high-gear synchronization rotation speed ratio, the controller 100 executes the second change control instead of the first change control.

FIG. 16 shows a change in the speed ratio of the power transmission system in the case where a change between the series-parallel low-gear mode and the parallel high-gear mode is performed by the use of the second change control. The abscissa axis and the rectangular regions (A) to (E) in FIG. 16 are similar to those of FIG. 15, so the detailed description will not be repeated.

For example, it is assumed that the current control mode is the series-parallel low-gear mode and the current speed ratio is A(1) between the low-gear synchronization rotation speed ratio and the high-gear synchronization rotation speed ratio. In this case, if the control mode is changed to the parallel high-gear mode by the use of the first change control, the direction in which the speed ratio of the power transmission system changes as a result of the first synchronization control (speed reduction direction) and the direction in which the speed ratio of the power transmission system changes as a result of the second synchronization control (speed increasing direction) are opposite to each other as indicated by the alternate long and short dashes line in FIG. 16. That is, if the controller 100 executes the first change control, the speed ratio of the power transmission system changes in both the speed reduction direction and the speed increasing direction during the first change control, so a user experiences a feeling of strangeness.

The controller 100 changes the control mode from the series-parallel low-gear mode to the parallel high-gear mode by the use of the second change control.

In the second change control, the speed ratio of the power transmission system changes along the path indicated by the continuous arrow in FIG. 16. Specifically, the controller 100 sequentially executes the following process.

Initially, the controller 100 changes the speed stage of the transmission unit 40 from the low gear stage Lo to the high gear stage Hi. That is, the controller 100 changes the control mode from the series-parallel low-gear mode to the series-parallel high-gear mode. The number of objects that are controlled at the same time in this change is three, that is, C1, B1 and Tm1, as shown in the combination of (B) and (c) in FIG. 14, and is smaller than four.

After the speed stage of the transmission unit 40 is changed from the low gear stage Lo to the high gear stage Hi, the controller 100 changes the drive mode from the series-parallel mode to the parallel mode. That is, the controller 100 changes the control mode from the series-parallel high-gear mode to the parallel high-gear mode. The number of objects that are controlled at the same time in this change is two, that is, CS and Tm1, as shown in the combination of (C) and (e) in FIG. 14, and is smaller than four.

In this way, when the control mode is changed from the series-parallel low-gear mode to the parallel high-gear mode by the use of the second change control as well, the number of objects that are controlled at the same time is smaller than four that is the number of objects that are controlled at the same time in the case where the control mode is directly changed from the series-parallel low-gear mode to the parallel high-gear mode, so control is simplified.

When the control mode is changed from (C) series-parallel high-gear mode to (d) parallel low-gear mode, from (D) parallel low-gear mode to (c) series-parallel high-gear mode or from (E) parallel high-gear mode to (b) series-parallel low-gear mode by the use of the second change control as well, the number of objects that are controlled at the same time is smaller than four, so control is simplified.

In this way, in the second change control, without passing through the series mode, a change in one of the drive mode and the speed stage is performed and then a change in the other one of the drive mode and the speed stage is performed. Therefore, as shown in FIG. 16, it is possible to simplify control while avoiding a change in the speed ratio in both the speed reduction direction and the speed increasing direction.

Figure 17:
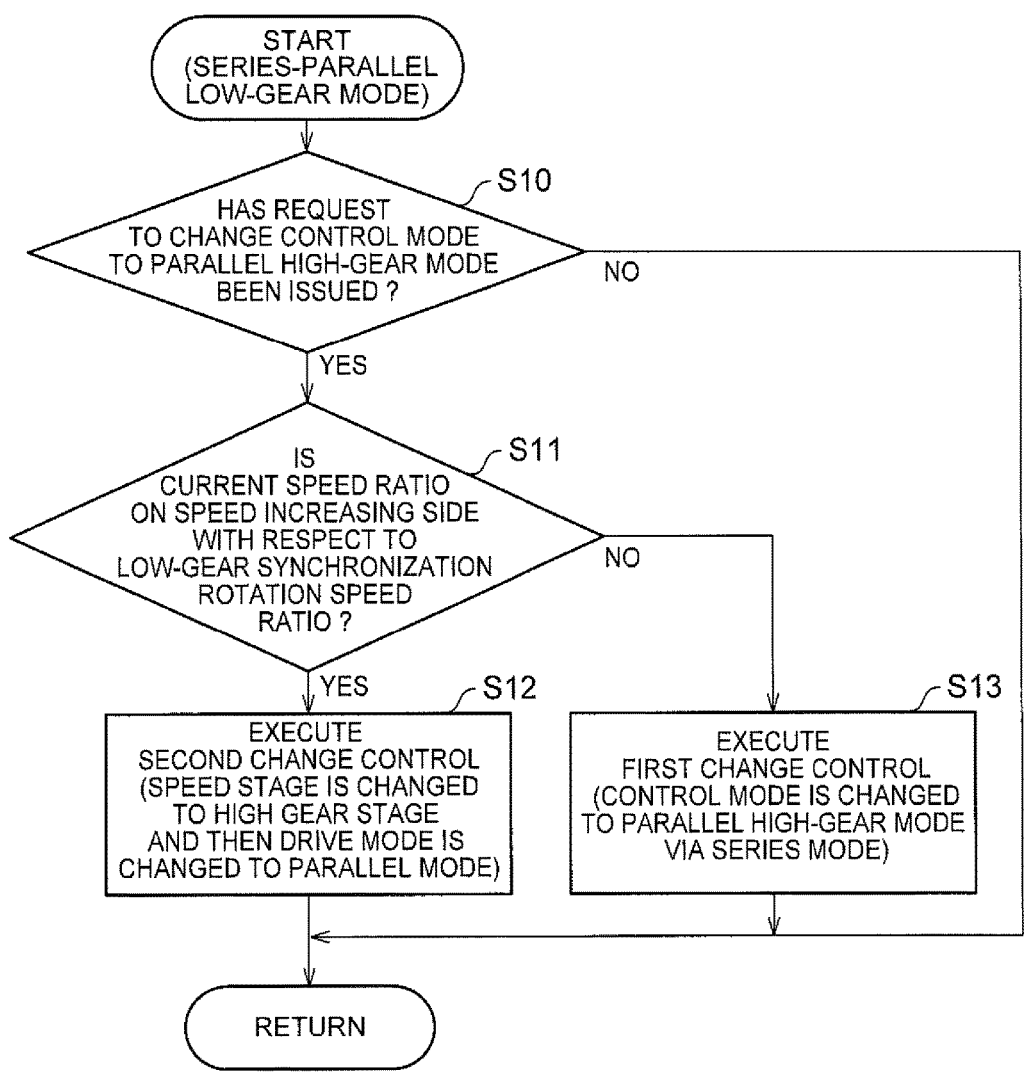
FIG. 17 is a first flowchart that shows the procedure of the controller.

FIG. 17 is a flowchart that shows a procedure that is executed by the controller 100 at the time when the control mode is changed from the series-parallel low-gear mode to the parallel high-gear mode.

In step (hereinafter, step is abbreviated as "S") 10, the controller 100 determines whether a request to change the control mode to the parallel high-gear mode has been issued.

The controller 100 determines whether a request to change the control mode to the parallel high-gear mode has been issued on the basis of the vehicle speed, the vehicle load and the maps shown in FIG. 12 and FIG. 13. When a request to change the control mode to the parallel high-gear mode has been issued (YES in S10), the process proceeds to S11. Otherwise (NO in S10), the process is ended.

In S11, the controller 100 determines whether the current speed ratio (an actual value of the speed ratio of the power transmission system) is on a speed increasing side with respect to the low-gear synchronization rotation speed ratio. The controller 100, for example, calculates the current speed ratio on the basis of the rotation speed of the engine 10 and the rotation speed of the ring gear R2 of the differential unit 50. When the current speed ratio is on a speed increasing side with respect to the low-gear synchronization rotation speed ratio (YES in S11), that is, when the current speed ratio falls between the low-gear synchronization rotation speed ratio and the high-gear synchronization rotation speed ratio, the process proceeds to S12. When the current speed ratio is not on a speed increasing side with respect to the low-gear synchronization rotation speed ratio (NO in S11), that is, when the current speed ratio does not fall between the low-gear synchronization rotation speed ratio and the high-gear synchronization rotation speed ratio, the process proceeds to S13.

In S12, the controller 100 changes the control mode from the series-parallel low-gear mode to the parallel high-gear mode by the use of the second change control. That is, the controller 100 changes the speed stage of the transmission unit 40 from the low gear stage Lo to the high gear stage Hi and then changes the drive mode from the series-parallel mode to the parallel mode.

In S13, the controller 100 changes the control mode from the series-parallel low-gear mode to the parallel high-gear mode by the use of the first change control. That is, the controller 100 changes the control mode from the series-parallel low-gear mode to the parallel high-gear mode via (by passing through) the series mode. More specifically, the controller 100 synchronizes the speed ratio of the power transmission system with the low-gear synchronization rotation speed ratio in series-parallel low-gear mode, then changes the drive mode to the series mode, after that, synchronizes the speed ratio of the power transmission system with the high-gear synchronization rotation speed ratio in series mode, and then changes the control mode to the parallel high-gear mode.

Figure 18:
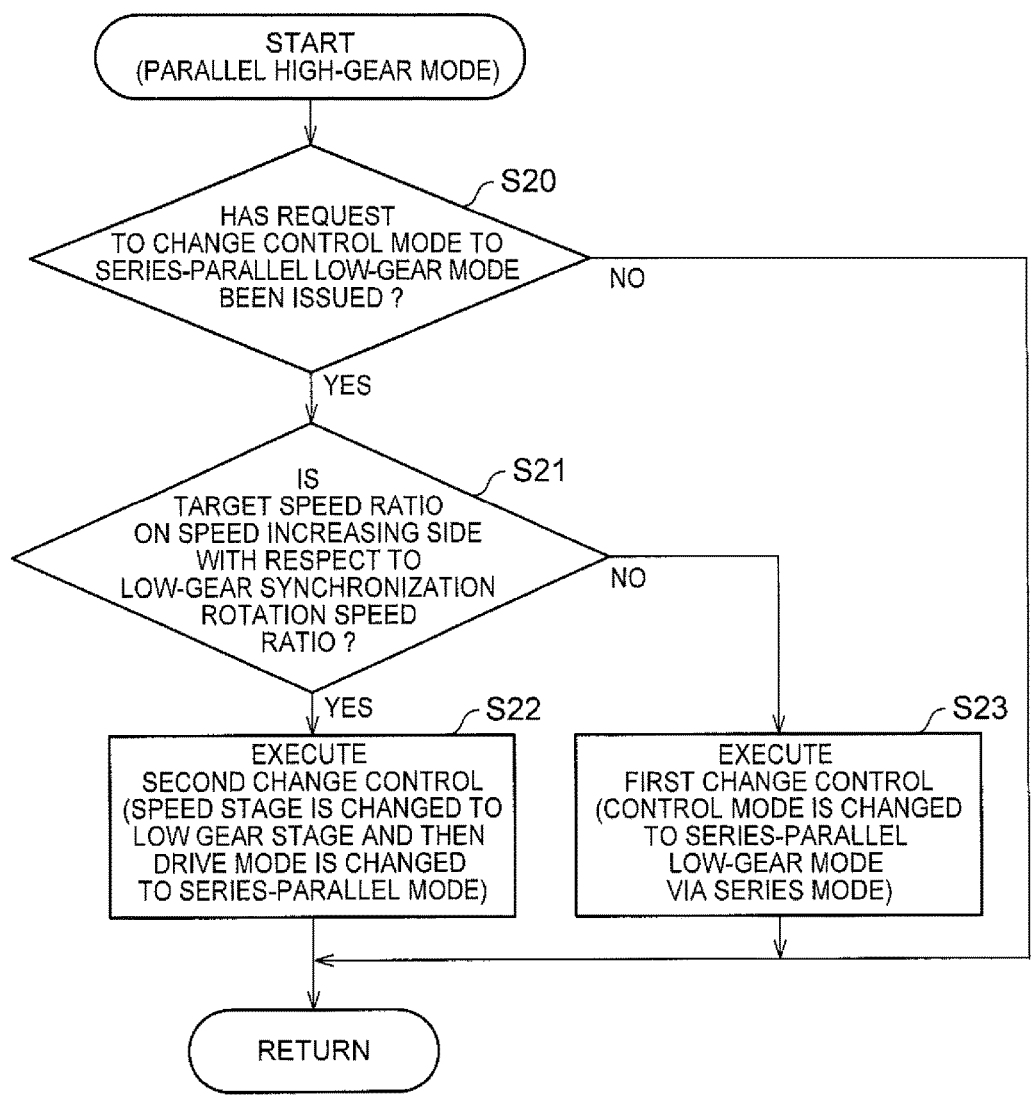
FIG. 18 is a second flowchart that shows the procedure of the controller.

FIG. 18 is a flowchart that shows a procedure that is executed by the controller 100 at the time when the control mode is changed from the parallel high-gear mode to the series-parallel low-gear mode.

In S20, the controller 100 determines whether a request to change the control mode to the series-parallel low-gear mode has been issued. The controller 100 determines whether a request to change the control mode to the series-parallel low-gear mode has been issued on the basis of the vehicle speed, the vehicle load and the maps shown in FIG. 12 and FIG. 13. When a request to change the control mode to the series-parallel low-gear mode has been issued (YES in S20), the process proceeds to S21. Otherwise (NO in S20), the process is ended.

In S21, the controller 100 determines whether a target speed ratio (a target value of the speed ratio of the power transmission system) is on a speed increasing side with respect to the low-gear synchronization rotation speed ratio. The controller 100, for example, determines the target speed ratio on the basis of the traveling state of the vehicle 1 and the control mode after the change. When the target speed ratio is on a speed increasing side with respect to the low-gear synchronization rotation speed ratio (YES in S21), that is, when the current speed ratio falls between the low-gear synchronization rotation speed ratio and the high-gear synchronization rotation speed ratio, the process proceeds to S22. When the current speed ratio is not on a speed increasing side with respect to the low-gear synchronization rotation speed ratio (NO in S21), that is, when the current speed ratio does not fall between the low-gear synchronization rotation speed ratio and the high-gear synchronization rotation speed ratio, the process proceeds to S23.

In S22, the controller 100 changes the control mode from the parallel high-gear mode to the series-parallel low-gear mode by the use of the second change control. That is, the controller 100 changes the drive mode from the parallel mode to the series-parallel mode and then changes the speed stage of the transmission unit 40 from the high gear stage Hi to the low gear stage Lo without passing through the series mode.

In S23, the controller 100 changes the control mode from the parallel high-gear mode to the series-parallel low-gear mode by the use of the first change control. That is, the controller 100 changes the control mode from the parallel high-gear mode to the series-parallel low-gear mode via (by passing through) the series mode. More specifically, the controller 100 changes the drive mode from the parallel mode to the series mode, synchronizes the speed ratio of the power transmission system with the low-gear synchronization rotation speed ratio in series mode, then changes the control mode to the series-parallel low-gear mode, after that, controls the MG1 torque such that the speed ratio of the power transmission system becomes the target speed ratio in series-parallel low-gear mode.

Figure 19:
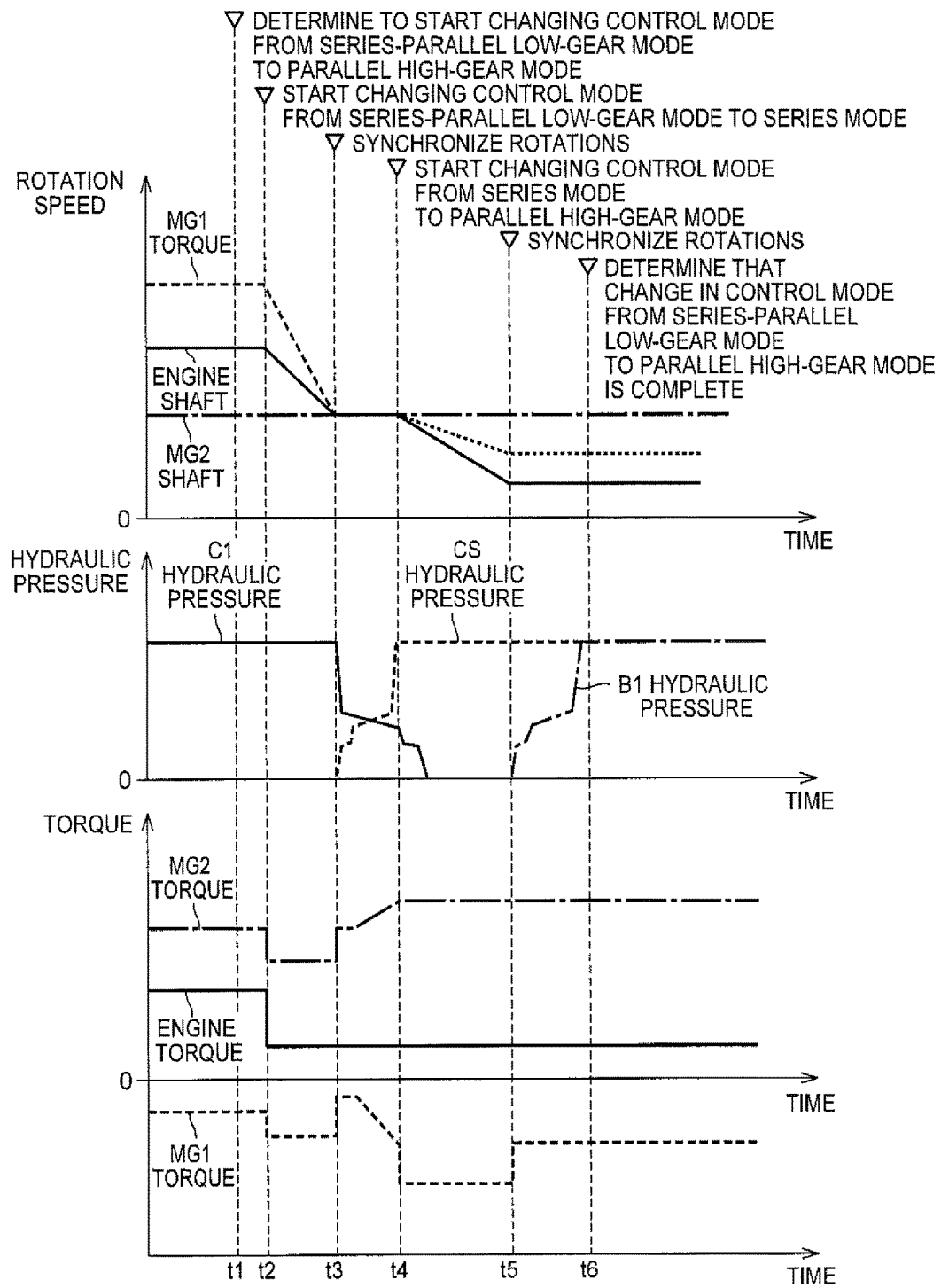
FIG. 19 is a timing chart that shows an example of changes in operations of rotating elements, operations of engagement elements and output torque of each power source in the case where the control mode is changed from the series-parallel low-gear mode to the parallel high-gear mode by the use of the first change control.

FIG. 19 is a timing chart that shows an example of changes in operations of the rotating elements and output torque of each power source in the case where the control mode is changed from the series-parallel low-gear mode to the parallel high-gear mode by the use of the first change control (via the series mode). In FIG. 19, for the sake of convenience of description, it is assumed that the accelerator operation amount is constant.

The top graph of FIG. 19 is a timing chart that shows temporal changes in the rotation speeds of the rotating elements (the rotary shaft of the first MG 20, the output shaft of the engine 10 and the rotary shaft of the second MG 30). In the top graph of FIG. 19, the ordinate axis represents rotation speed, and the abscissa axis represents time.

The middle graph of FIG. 19 is a timing chart that shows temporal changes in hydraulic pressures that are respectively supplied to the engagement elements (the clutch C1, the brake B1 and the clutch CS). In the middle graph of FIG. 19, the ordinate axis represents hydraulic pressure, and the abscissa axis represents time.

The bottom graph of FIG. 19 is a timing chart that shows temporal changes in output torques of the power sources (the engine 10, the first MG 20 and the second MG 30). In the bottom graph of FIG. 19, the ordinate axis represents torque, and the abscissa axis represents time.

When a request to change the control mode from the series-parallel low-gear mode to the parallel high-gear mode has been issued at time t1, a change from the series-parallel low-gear mode to the series mode is started at time t2. At this time, the rotation speed of the engine 10 is decreased as a result of an increase in the MG1 torque (negative torque) in the negative direction. Inertia torque is released to the drive wheels 90 side as a result of a decrease in the rotation speed of the engine 10, the MG2 torque is reduced. As a result of a decrease in the rotation speed of the engine 10, the speed ratio changes so as to approach the low-gear synchronization rotation speed ratio.

The MG1 torque is reduced in the positive direction at the timing at which the speed ratio is synchronous with the low-gear synchronization rotation speed ratio at time t3, the synchronous state is maintained. At this time, the hydraulic pressure that is supplied to the clutch C1 is decreased such that the clutch C1 is set to the released state, and the hydraulic pressure that is supplied to the clutch CS is increased such that the clutch CS is set to the engaged state.

The hydraulic pressure of the clutch CS increases to an upper limit value at time t4, so a change in the drive mode to the series mode completes. When a change in the drive mode to the series mode completes, a change in the control mode to the parallel high-gear mode is started. When a change in the control mode to the parallel high-gear mode is started, the rotation speed of the engine 10 is further decreased by increasing the negative torque of the first MG 20 in the negative direction. Therefore, the speed ratio changes so as to approach the high-gear synchronization rotation speed ratio. At this time, because the output shaft of the engine 10 is separated from the drive wheels 90, no inertia toque is released.

The negative torque of the first MG 20 is reduced in the positive direction at the timing at which the speed ratio is synchronous with the high-gear synchronization rotation speed ratio at time t5, so the synchronous state is maintained. At this time the hydraulic pressure that is supplied to the brake B1 is increased such that the brake B1 is set to the engaged state. At time t6, a change in the control mode to the parallel high-gear mode completes.

As described above, with the hybrid vehicle according to the present embodiment, when a request to change the control mode between the series-parallel low-gear mode and the parallel high-gear mode has been issued or when a request to change the control mode between the series-parallel high-gear mode and the parallel low-gear mode has been issued (that is, when a request to change both the drive mode and the speed stage of the transmission unit 40 has been issued), any one of the first change control and the second change control is selectively executed. In the first change control, the drive mode and the speed stage are changed via (by passing through) the series mode. In the second change control, a change in one of the drive mode and the speed stage of the transmission unit 40 is performed and then a change in the other one of the drive mode and the speed stage is performed without passing through the series mode. Therefore, in comparison with the case where the drive mode and the speed stage of the transmission unit 40 are changed at the same time, an increase in controlled elements that are controlled at the same time is suppressed, so it is possible to simplify shift control. In addition, it is possible to appropriately select any one of the first change control that passes through the series mode and the second change control that does not pass through the series mode in response to the state of the vehicle.

Alternative Embodiments

The above-described embodiment may be, for example, modified into the following alternative embodiments.

(1) In the present embodiment, the case where the control mode is changed between the series-parallel low-gear mode and the parallel high-gear mode is mainly described.

However, when the control mode is changed between the series-parallel high-gear mode and the parallel low-gear mode as well, an increase in the number of controlled elements that are controlled at the same time is suppressed by selectively executing any one of the first change control and the second change control, so it is possible to simplify shift control. A change in the control mode between the series-parallel high-gear mode and the parallel low-gear mode is similar to a change in the control mode between the series-parallel low-gear mode and the parallel high-gear mode except that a combination of the engagement states of the clutch C1 and brake B1 and speed ratios to be synchronized are different, so the detailed description thereof will not be repeated.

(2) In the present embodiment, the case where it is determined whether the control mode is changed by the use of the first change control or changed by the use of the second change control in response to whether an actual value of the speed ratio of the power transmission system before the change (or a target value of the speed ratio of the power transmission system after the change) falls between the low-gear synchronization rotation speed ratio and the high-gear synchronization rotation speed ratio is described. However, the condition to determine whether the control mode is changed by the use of the first change control or changed by the use of the second change control is not limited to the above-described condition.

(2-1) For example, when the vehicle load is higher than a threshold that is set on the basis of heat loss, the controller 100 may change the control mode by the use of the first change control. In a change in the control mode by the use of the first change control, as compared to a change in the control mode by the use of the second change control, there are larger number of paths through which current flows under the influence of, for example, accompanied synchronization control using the MG1 torque, so heat loss increases. On the other hand, in a change in the control mode by the use of the second change control, mechanical heat loss due to a slip of the engagement elements occurs. The mechanical heat loss tends to increase as the vehicle load increases. Therefore, by setting the threshold to be compared with the vehicle load to a value at which mechanical heat loss is larger than electrical heat loss, it is possible to suppress an increase in heat loss at the time of changing the control mode.

Figure 20:
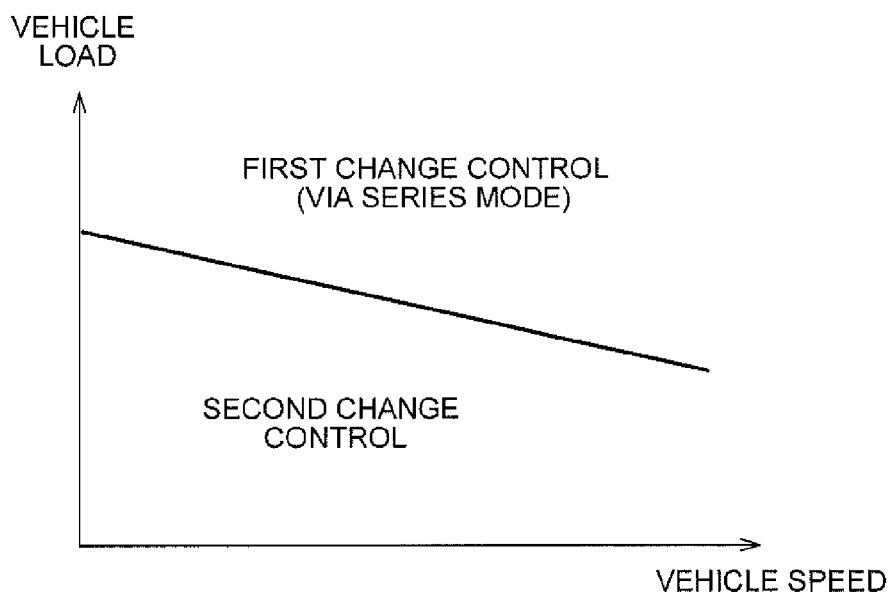
FIG. 20 is a first view that shows an example of a map for determining whether the control mode is changed by the use of the first change control or changed by the use of the second change control.

FIG. 20 is a view that shows an example of a map for determining whether the control mode is changed by the use of the first change control or changed by the use of the second change control in response to whether the vehicle load is higher than a threshold that is set on the basis of heat loss. In FIG. 20, the ordinate axis represents vehicle load, and the abscissa axis represents vehicle speed. The threshold that linearly changes with a vehicle speed is set in FIG. 20. The threshold shown in FIG. 20 is one example, and is not limited to a value that linearly changes. The threshold may be, for example, a value that non-linearly changes. As shown in FIG. 20, the threshold is set so as to reduce as the vehicle speed increases.

The controller 100 may calculate a threshold corresponding to a vehicle speed by consulting the map shown in FIG. 20, may change the control mode by the use of the first change control when the vehicle load exceeds the threshold, and may change the control mode by the use of the second change control when the vehicle load is lower than the threshold.

(2-2) Alternatively, the controller 100 may change the control mode by the use of the second change control when a mode, such as a sport mode, that is selected when a user requires the high response of driving force is selected. A change in the control mode by the use of the first change control requires synchronization of the speed ratio and switching of the engagement states of the engagement elements sequentially, so a time from the start of the change to the completion of the change may be longer compared to a change in the control mode by the use of the second change control. Therefore, when a mode, such as a sport mode, is selected by a user, it is possible to quickly change the control mode by changing the control mode by the use of the second change control. Therefore, it is possible to suppress deterioration of the response of driving force.

(2-3) Alternatively, the controller 100 may change the control mode by the use of the first change control when a mode, such as a comfort mode, that is selected when a user requires a relatively quiet vehicle traveling is selected. A change in the control mode by the use of the second change control changes the control mode by causing the engagement elements for hydraulic control to slip as compared to a change in the control mode by the use of the first change control, so vibrations, or the like, may occur in the vehicle. Therefore, when a mode, such as a comfort mode, is selected, it is possible to suppress occurrence of vibrations, or the like, by changing the control mode by the use of the first change control.

(2-4) Alternatively, the controller 100 may change the control mode by the use of the first change control when an oil temperature is lower than a threshold. When hydraulic multiple disc clutches are used as the engagement elements, controllability may deteriorate under a low-temperature environment. Therefore, vibrations, or the like, may occur in the vehicle when the engagement elements are caused to slip. Therefore, when the oil temperature is lower than the threshold, that is, in a temperature range in which controllability deteriorates, it is possible to suppress occurrence of vibrations, or the like, by changing the control mode by the use of the first change control.

(2-5) Alternatively, the controller 100 may change the control mode by the use of the second change control when the vehicle load is higher than a threshold that is set on the basis of the rated output of the first MG 20. A change in the control mode by the use of the first change control may be larger in the input/output power of the first MG 20 than a change in the control mode by the use of the second change control. Therefore, when the vehicle load is a value that exceeds the rated output of the first MG 20, it is possible to suppress the operation of the first MG 20 over the rated output by changing the control mode by the use of the second change control.

Figure 21:
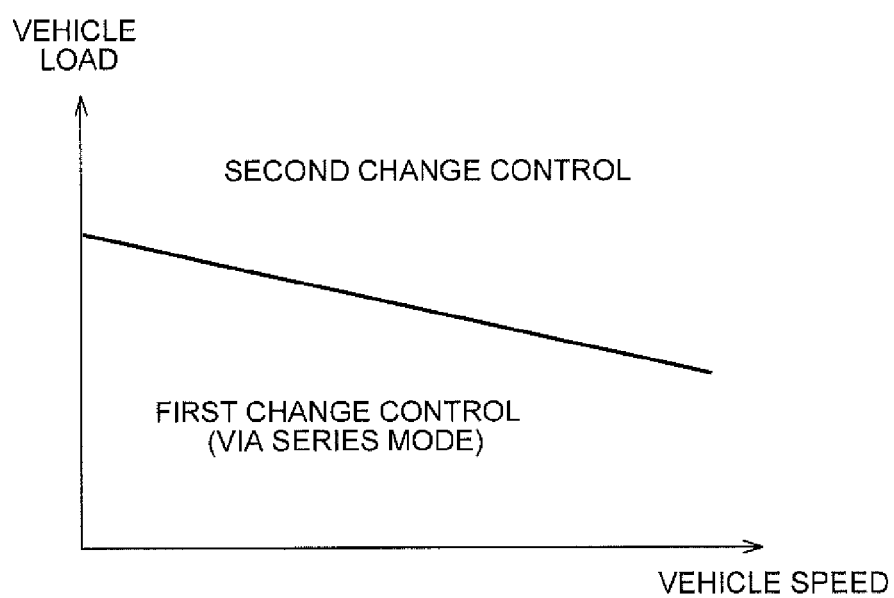
FIG. 21 is a second view that shows an example of a map for determining whether the control mode is changed by the use of the first change control or changed by the use of the second change control.

FIG. 21 is a view that shows an example of a map for determining whether the control mode is changed by the use of the first change control or changed by the use of the second change control in response to whether the vehicle load is higher than a threshold that is set on the basis of the rated output of the first MG 20. In FIG. 21, the ordinate axis represents vehicle load, and the abscissa axis represents vehicle speed. The threshold that linearly changes with a vehicle speed is set in FIG. 21. The threshold shown in FIG. 21 is one example, and is not limited to a value that linearly changes. The threshold may be, for example, a value that non-linearly changes. As shown in FIG. 21, the threshold is set so as to reduce as the vehicle speed increases.

The controller 100 may calculate a threshold corresponding to a vehicle speed by consulting the map shown in FIG. 21, may change the control mode by the use of the second change control when the vehicle load exceeds the threshold, and may change the control mode by the use of the first change control when the vehicle load is lower than the threshold.

(2-6) Alternatively, the controller 100 may change the control mode by the use of the second change control when the temperature of the first MG 20 or the temperature of an inverter that drives the first MG 20 is higher than a threshold. Alternatively, the controller 100 may change the control mode by the use of the first change control when the temperature of at least any one of the clutch C1, the brake B1 and the clutch CS is higher than a threshold. With this configuration, it is possible to suppress a high-temperature of a device that is used in changing the control mode.

The above-described embodiment and alternative embodiments may be combined with each other as needed.

The embodiments described above are illustrative and not restrictive in all respects.

The invention claimed is:

1. A hybrid vehicle comprising:
an internal combustion engine:
a first rotary electric machine;
a second rotary electric machine configured to output power to a drive wheel;
a transmission including an input element configured to receive power from the internal combustion engine and an output element configured to output power, the transmission being configured to switch between a non-neutral state where power is transmitted between the input element and the output element in either one of a low speed stage and a high speed stage, and a neutral state where power is not transmitted between the input element and the output element;
a differential unit including a first rotating element, a second rotating element and a third rotating element, the first rotating element being connected to the first rotary electric machine, the second rotating element being connected to the second rotary electric machine and the drive wheel, the third rotating element being connected to the output element, the differential unit being configured such that, when rotation speeds of any two of the first rotating element, the second rotating element and the third rotating element are determined, a rotation speed of a remaining one of the first rotating element, the second rotating element and the third rotating element is determined;
a clutch provided in a second path through which power is transmitted from the internal combustion engine to the first rotary electric machine, the second path being different from a first path through which power is transmitted from the internal combustion engine to the first rotary electric machine via the transmission and the differential unit, the clutch being configured to switch between an engaged state where power is transmitted from the internal combustion engine through the second path to the first rotary electric machine and a released state where transmission of power from the internal combustion engine through the second path to the first rotary electric machine is interrupted; and
an electronic control unit configured to change a drive mode among a series-parallel mode, a parallel mode and a series mode, the electronic control unit being configured to (i) control the clutch and the transmission in the series-parallel mode such that the clutch is set to the released state and the transmission is set to the non-neutral state, (ii) control the clutch and the transmission in the parallel mode such that the clutch is set to the engaged state and the transmission is set to the non-neutral state, and (iii) control the clutch and the transmission in the series mode such that the clutch is set to the engaged state and the transmission is set to the neutral state, the electronic control unit being further configured to, when the drive mode is changed from one of the series-parallel mode and the parallel mode to the other one of the series-parallel mode and the parallel mode and the speed stage is changed from one of the low speed stage and the high speed stage to the other one of the low speed stage and the high speed stage, selectively execute either one of a first control and a second control, the first control being control in which the drive mode and the speed stage are changed by passing through the series mode, the second control being control in which one of the drive mode and the speed stage is changed and then the other one of the drive mode and the speed stage is changed without passing through the series mode.

2. The hybrid vehicle according to claim 1, wherein the electronic control unit is configured to execute the second control when it is predicted that executing the first control will cause a rotation speed ratio between the input element of the transmission and the second rotating element of the differential unit to change in both a speed reduction direction and in a speed increasing direction, and the electronic control unit is configured to execute the first control when it is predicted that executing the first control will cause the rotation speed ratio to change in one of the speed reduction direction and the speed increasing direction.

3. The hybrid vehicle according to claim 2, wherein the electronic control unit is configured to prestore the rotation speed ratio at the time when the one of the low speed stage and the high speed stage is established in the parallel mode, as a first synchronization rotation speed ratio, prestore the rotation speed ratio at the time when the other one of the low speed stage and the high speed stage is established in the parallel mode, as a second synchronization rotation speed ratio, and when the drive mode is changed from the series-parallel mode to the parallel mode and the speed stage is changed from the one of the low speed stage and the high speed stage to the other one of the low speed stage and the high speed stage, and when an actual value of the rotation speed ratio falls between the first synchronization rotation speed ratio and the second synchronization rotation speed ratio, predict that the rotation speed ratio changes in both the speed reduction direction and the speed increasing direction in a case where the electronic control unit executes the first control.

4. The hybrid vehicle according to claim 3, wherein the first control is control in which (1) the rotation speed ratio is synchronized with the first synchronization rotation speed ratio in the series-parallel mode, (2) then the drive mode is changed to the series mode, (3) then the rotation speed ratio is synchronized with the second synchronization rotation speed ratio in the series mode, (4) then the drive mode is changed to the parallel mode and the speed stage is changed to the other one of the low speed stage and the high speed stage, and the second control is control in which the speed stage is changed from the one of the low speed stage and the high speed stage to the other one of the low speed stage and the high speed stage and then the drive mode is changed from the series-parallel mode to the parallel mode.

5. The hybrid vehicle according to claim 2, wherein the electronic control unit is configured to prestore the rotation speed ratio at the time when the one of the low speed stage and the high speed stage is established in the parallel mode, as a first synchronization rotation speed ratio, prestore the rotation speed ratio at the time when the other one of the low speed stage and the high speed stage is established in the parallel mode, as a second synchronization rotation speed ratio, and when the drive mode is changed from the parallel mode to the series-parallel mode and the speed stage is changed from the one of the low speed stage and the high speed stage to the other one of the low speed stage and the high speed stage, and when a target value of the rotation speed ratio falls between the first synchronization rotation speed ratio and the second synchronization rotation speed ratio, predict that the rotation speed ratio changes in both the speed reduction direction and the speed increasing direction in a case where the electronic control unit executes the first control.

6. The hybrid vehicle according to claim 5, wherein the first control is control in which (1) the drive mode is changed from the parallel mode to the series mode, (2) then the rotation speed ratio is synchronized with the second synchronization rotation speed ratio in the series mode, (3) then the drive mode is changed to the series-parallel mode and the speed stage is changed to the other one of the low speed stage and the high speed stage, and the second control is control in which the drive mode is changed from the parallel mode to the series-parallel mode and then the speed stage is changed from the one of the low speed stage and the high speed stage to the other one of the low speed stage and the high speed stage.

* * * * *